(12) United States Patent
Kadono

(10) Patent No.: US 7,847,831 B2
(45) Date of Patent: Dec. 7, 2010

(54) IMAGE SIGNAL PROCESSING APPARATUS, IMAGE CODING APPARATUS AND IMAGE DECODING APPARATUS, METHODS THEREOF, PROCESSORS THEREOF, AND, IMAGING PROCESSOR FOR TV CONFERENCE SYSTEM

(75) Inventor: Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 11/896,063

(22) Filed: Aug. 29, 2007

(65) Prior Publication Data
US 2008/0088697 A1 Apr. 17, 2008

(30) Foreign Application Priority Data
Aug. 30, 2006 (JP) .............................. 2006-234527

(51) Int. Cl.
G06K 9/36 (2006.01)
G06K 9/20 (2006.01)
G06K 9/32 (2006.01)
H04N 5/228 (2006.01)
H04N 7/14 (2006.01)

(52) U.S. Cl. ................. 348/222.1; 348/14.02; 382/276; 382/282; 382/289

(58) Field of Classification Search ............... 348/14.02
See application file for complete search history.

(56) References Cited

U.S. PATENT DOCUMENTS

| | | | |
|---|---|---|---|
| 4,908,874 A * | 3/1990 | Gabriel ........................ 382/277 |
| 5,623,560 A * | 4/1997 | Nakajima et al. ............ 382/295 |
| 6,367,933 B1 * | 4/2002 | Chen et al. ..................... 353/69 |
| 2002/0130953 A1 * | 9/2002 | Riconda et al. .............. 348/115 |
| 2003/0081857 A1 * | 5/2003 | Tapson ........................ 382/275 |
| 2004/0240750 A1 * | 12/2004 | Chauville et al. ............ 382/275 |
| 2005/0078192 A1 * | 4/2005 | Sakurai et al. .......... 348/207.99 |
| 2006/0093237 A1 * | 5/2006 | Jacobsen et al. ............. 382/275 |
| 2006/0280376 A1 * | 12/2006 | Lei .............................. 382/275 |
| 2007/0036455 A1 * | 2/2007 | Hoshino ...................... 382/254 |
| 2007/0070207 A1 * | 3/2007 | Sakurai .................. 348/207.99 |
| 2007/0115440 A1 * | 5/2007 | Wiklof ......................... 353/69 |
| 2007/0172230 A1 * | 7/2007 | Wernersson ................. 396/439 |

FOREIGN PATENT DOCUMENTS

JP 3109580 9/2000

* cited by examiner

Primary Examiner—Lin Ye
Assistant Examiner—Chia-Wei A Chen
(74) Attorney, Agent, or Firm—Wenderoth, Lind & Ponack, L.L.P.

(57) ABSTRACT

In the teleconference and videophone system, a display apparatus is placed in front of the speaker, and thus a camera cannot be placed in front of the speaker. This causes distortions in the image shot by the camera. With the image signal processing apparatus of the present invention, a parameter detecting unit detects a distortion of a line in a vertical direction in a distortion detecting picture in which the distortion is detected. The image correcting unit corrects an image in a picture to be corrected which is inputted subsequent to the distortion detecting picture, so as to eliminate a horizontal shift of the image corresponding to the distortion of the line in the vertical direction detected by the parameter detecting unit.

13 Claims, 24 Drawing Sheets

Input picture

Corrected picture

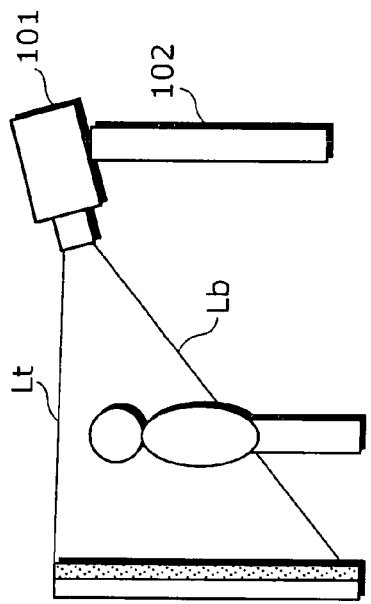
FIG. 2A Lateral view
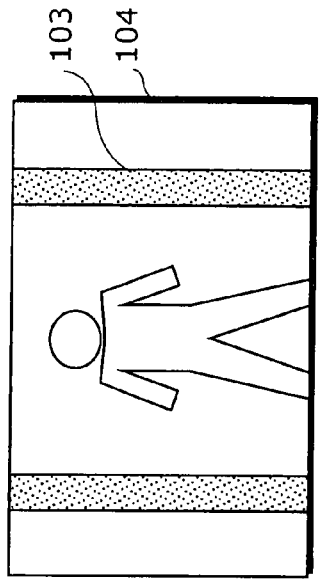
FIG. 2B Front view
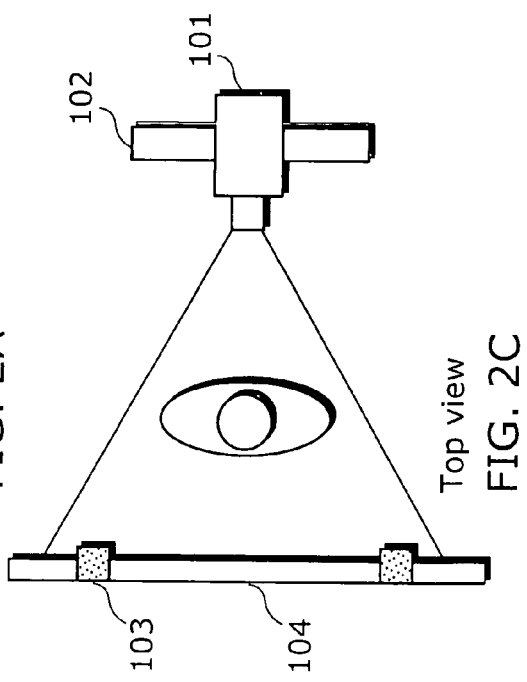
FIG. 2C Top view
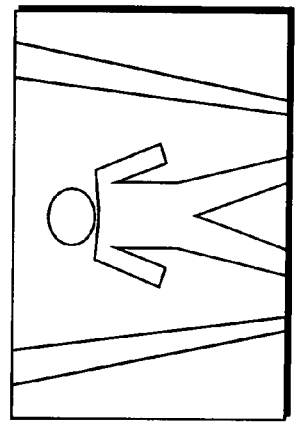
FIG. 2D Image shot by camera

| L0 | R0 |
| --- | --- |
| L1 | R1 |
| L2 | R2 |
| L3 | R3 |
| L4 | R4 |
| L5 | R5 |
| L6 | R6 |
| L7 | R7 |

Divided units

Corrected picture

Input picture

Expression (A) ··· x={(c_ave−a_ave)Y+(d_ave−b_ave)}(X−W/2)/W
+{a_ave · Y+b_ave}

IMAGE SIGNAL PROCESSING APPARATUS, IMAGE CODING APPARATUS AND IMAGE DECODING APPARATUS, METHODS THEREOF, PROCESSORS THEREOF, AND, IMAGING PROCESSOR FOR TV CONFERENCE SYSTEM

BACKGROUND OF THE INVENTION (1) Field of the Invention

The present invention relates to an image signal processing method for correcting distortions that occur in images shot at a set position and orientation of a camera, and modifying the distorted images into images which give more natural impressions to viewers, mainly in teleconference and videophone systems.

(2) Description of the Related Art

Since digital broadcasting and next-generation optical discs are now applicable to High-Definition Televisions (HDTV), large-sized screen display apparatuses such as HDTV-compatible Plasma Display Panels (PDP) displays and HDTV-compatible liquid crystal displays and the like have rapidly come into wide use. Further, high-speed network environment in which optical fiber is used has been popularized, enabling transmission and reception of data at a bit rate exceeding several Mbit/s even in common households. In the next few years, it is expected that transmission and reception of data at several dozen Mbit/s will be possible, and it is predicted that using image coding technology will accelerate the introduction of high-quality videophone and teleconference systems not only among companies with dedicated lines but also among general households.

When teleconferences are conducted and videophone calls are made, it is preferable to shoot front-view images of the speaker and send the same to the party at the other end. This is easily understood by analogy that in communication, talking with an eye contact gives a favorable impression on the other party and facilitates the communication. However, in real-life teleconferences and videophone calls, it is difficult to shoot front-view images of the speaker who often faces the display screen of the display apparatus.

FIG. 1 is a diagram showing exemplary positions of a display apparatus and a camera used in a teleconference system. A camera 101 is placed on a display apparatus 102. For shooting front-view images, it is preferable that the camera 101 is placed at the center of the display apparatus 102. However, the camera 101 placed at the center of the display apparatus 102 hinders a person from viewing images of the party at the other end displayed on the display apparatus 102. Consequently, it is common to place the camera 101 at the position shown in FIG. 1.

In recent years, the size of the display apparatus 102 has become larger, and large screen displays exceeding 40 inches in size are found even in households. The use of the display apparatus 102 with a large screen makes it easy to view the images of the party at the other end. However, on the other hand, the use of the display apparatus 102 with the large screen results in the position of the camera 101 placed on the display apparatus 102 to significantly shift from the front of the speaker.

FIGS. 2A, 2B, 2C, and 2D are diagrams showing an exemplary shot image in which a part that should be vertical is distorted when it is shot. The speaker stands upright in front of wall 104 which is perpendicular to the floor and poles 103 which support the wall 104. The camera 101 is placed on the display apparatus 102 and faces slightly downwards in order to shoot images of the speaker. FIG. 2A is a lateral view, taken from a lateral side of the speaker, showing how the camera 101 and the display apparatus 102 are placed. FIG. 2B is a front view taken from the front of the speaker. FIG. 2C is a top view taken from the top of the speaker.

Since the camera 101 is placed on the display apparatus 102, the distance between the camera 101 and the speaker, the distance between the camera 101 and the wall 104, and the distance between the camera 101 and the poles 103 significantly differ from each other depending on the position of the camera 101. In other words, the distance between the camera 101 and the bottom of the poles 103 (Lb) is noticeably longer than the distance between the camera 101 and the top of the poles 103 (Lt). It is well known that the images shot by cameras decreases in size with the distance from the subject. Thus, images shot by the camera 101 placed in the above described position are as shown in FIG. 2D. Comparison between FIG. 2B and FIG. 2D shows that FIG. 2D gives an unnatural impression on viewers because the bottom part (that is, the part which is more distant from the camera 101) of the image shown in FIG. 2D is displayed in smaller size and the poles 103 which should be originally vertical are shot at an angle.

The distortion attributable to the position of the camera 101 being not in front of the speaker can be corrected by calculation, given that the distances between the camera 101 and the subjects (that is, the speaker, the wall 104 and the poles 103 in this case) are provided. For example, given that the position and the orientation of the camera 101 are fixed, it is possible to calculate a method for correcting the images by measuring the distances in advance (See Japanese Patent No. 3109580). The camera disclosed in Japanese Patent No. 3109580 is a document camera, and it discloses measuring the distance between the camera 101 and the subject (the base where documents are placed) and the orientation of the camera 101, and correcting the shot image through image signal processing based on the measured distance and orientation.

However, with regard to teleconferences and videophones, there are cases where the position of the camera is shifted and the number of participants of the conference, the image shooting area and the like are frequently changed before the conference starts, which makes measurement of the distance between the camera 101 and the subject and measurement of the orientation of the camera 101 difficult. Consequently, there is a problem that image correction using the above described conventional technique cannot easily be implemented.

There is also a method considered for detecting image distortions by analyzing a shot image itself and correcting the detected distortions, instead of measuring a distance between the camera 101 and a subject and an orientation of the camera 101 and correcting images according to the measured distance and orientation. According to this method, there is an advantage that even when the position and the shooting angle and the like of the camera 101 are frequently changed, image corrections can be performed without being affected by such changes.

However, even with this method, a delay of at least one picture occurs in order to detect image distortions by analyzing the shot image. For this reason, there is a problem that a memory is necessary in order to hold image data of at least one picture.

SUMMARY OF THE INVENTION

In order to solve the above described problems, an object of the present invention is to provide an image signal processing apparatus and an image signal processing method which allow economization on memory usage for holding image data even in the case where correction is performed by detecting distortions from shot images.

In order to solve the above described problems, the image signal processing apparatus according to the present invention is an image signal processing apparatus which corrects a distortion of an image in a picture in a moving picture including plural pictures that are sequentially inputted, the image signal processing apparatus including: a distortion detecting unit which detects the distortion of a line in a vertical direction in a distortion detecting picture in which the distortion is detected; and a correcting unit which corrects an image in a picture to be corrected which is inputted subsequent to the distortion detecting picture, so as to eliminate a horizontal shift of the image corresponding to the distortion of the line in the vertical direction detected by the distortion detecting unit.

In nature, and especially with man-made structures, perfectly vertical elements and perfectly horizontal elements are often involved and thus there are strong vertical correlations and strong horizontal correlations, however, there are no oblique correlations that are so strong. In addition, distortions that are most visible in a shot video are vertical and horizontal distortions. Therefore, when calculation of a degree of correlation from a shot image indicates that the correlation in the approximately vertical direction is great, it is assumed that the correlation should originally be the greatest in the perfectly vertical direction, and thus image modification involving horizontal expansion or contraction of the image is performed so as to have a stronger vertical correlation. By doing so, the image modification can be performed without using the actual distance between the camera 101 and the subject and the orientation of the camera 101, and an image can be reconstructed to have a strong vertical correlation and to give a more natural impression on viewers.

Furthermore, with teleconferences and videophones, it is rare that the position and the orientation of the camera are changed soon after the conference starts. Thus, instead of detecting a distortion in a picture, the distortion of which is to be corrected, detecting in advance a distortion in a picture inputted before the picture to be corrected allows detection of the same distortion as that of the picture to be corrected. Therefore, by calculating in advance a method for detecting a distortion which involves many calculations and calculations which are difficult to be performed in real time and a method for correcting such a detected distortion, and performing in real time only image modification processing that involves less calculations on the picture to be corrected, it is possible to perform image signal processing in a short time without causing a long delay.

By modifying a picture signal so that the part which should originally be vertical becomes vertical, the distortion of the shot image can be significantly reduced even in the case where the subject cannot be shot from the front, and thus it is possible to reduce the unnatural impression that the image gives during the teleconference and videophone call.

In the present invention, since the picture signal is modified using only information on the shot image, there is no need to measure or obtain by a sensor in advance the distance between the camera and the subject and the orientation of the camera, and thus the image correction can be accomplished inexpensively and easily.

FURTHER INFORMATION ABOUT TECHNICAL BACKGROUND TO THIS APPLICATION

The disclosure of Japanese Patent Application No. 2006-234527 filed on Aug. 30, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIGS. 2A, 2B, 2C, and 2D are diagrams showing an exemplary shot image in which a part that should be vertical is distorted when it is shot.

DESCRIPTION OF THE PREFERRED EMBODIMENT(S)

With reference to FIGS. 3 through 24, embodiments of the present invention shall be described below.

First Embodiment

Figure 1:
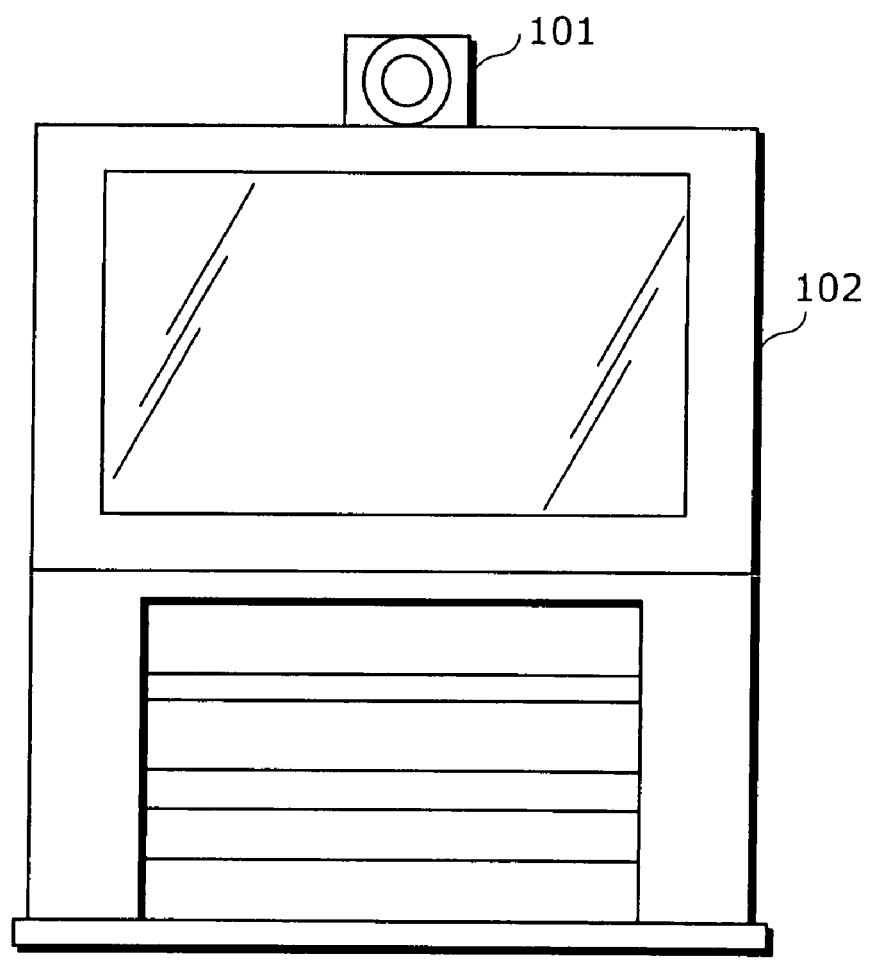
FIG. 1 is a diagram showing an exemplary position of a display apparatus and an exemplary position of a camera, used in a teleconference system.
Figure 3:
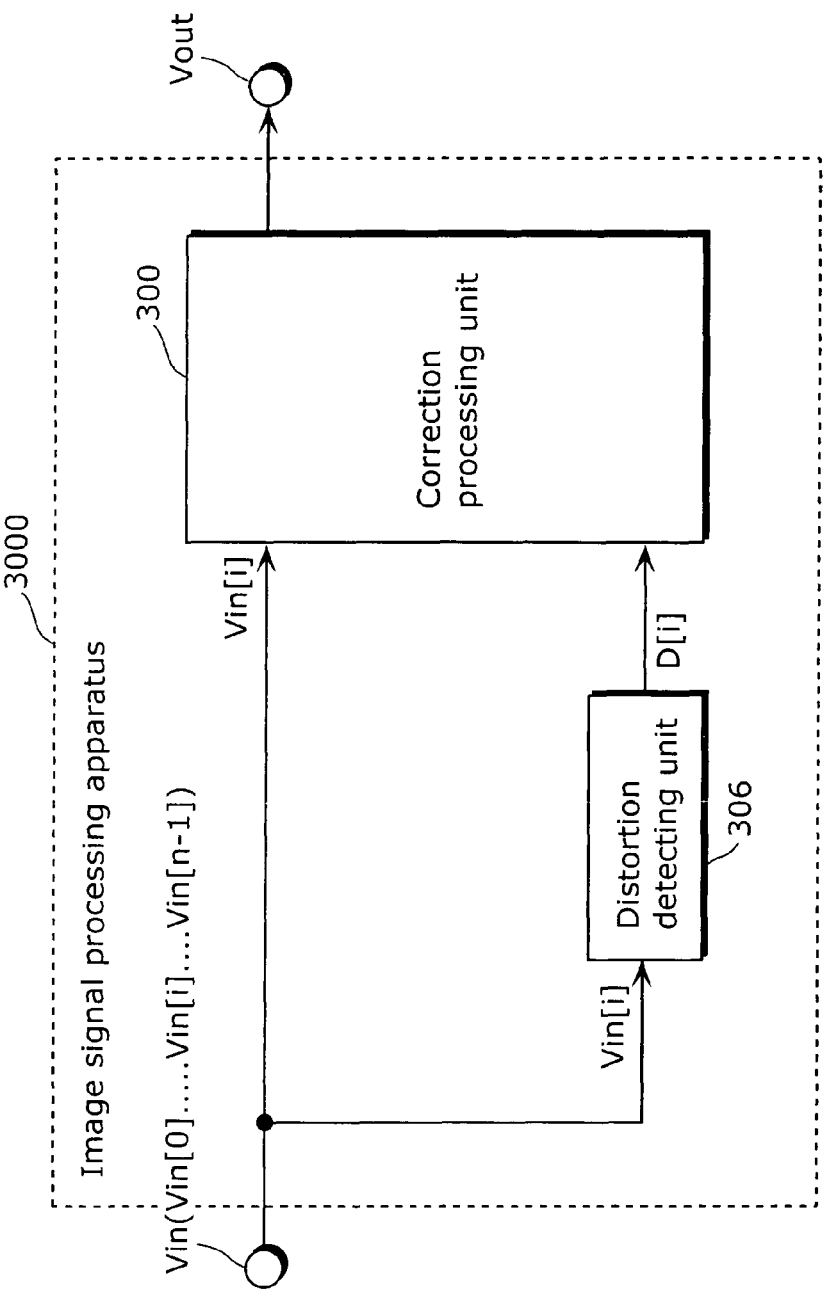
FIG. 3 is a block diagram showing a configuration of an image signal processing apparatus according to a first embodiment.

FIG. 3 is a block diagram showing a configuration of an image signal processing apparatus 3000 according to a first embodiment. The image signal processing apparatus according to the present embodiment is an image signal processing apparatus that calculates correlations in the vertical direction of a picture which is represented as an input picture signal (Vin), and generates an output picture by modifying an image in the picture in such a manner that the calculated correlation become the greatest. However, the image signal processing apparatus does not modify the initial picture, the vertical correlation of which is calculated, but outputs the initial picture as it is, and generates an output picture by modifying an image in a subsequent picture.

The image signal processing apparatus 3000 includes a distortion detecting unit 306 and a correction processing unit 300.

From a moving picture which includes plural pictures that are sequentially inputted, the distortion detecting unit 306 accepts a predetermined picture signal (a distortion detecting picture) and outputs a distortion signal D[i] of a line in the vertical direction within the picture (an [i] th picture) (or a signal corresponding to a distortion in the vertical direction).

The correction processing unit 300 accepts the vertical distortion signal of the i th picture and corrects an image in a picture (picture to be corrected: an [i+1] th picture) inputted subsequent to the i th picture, so as to eliminate a shift in the horizontal direction.

Figure 4:
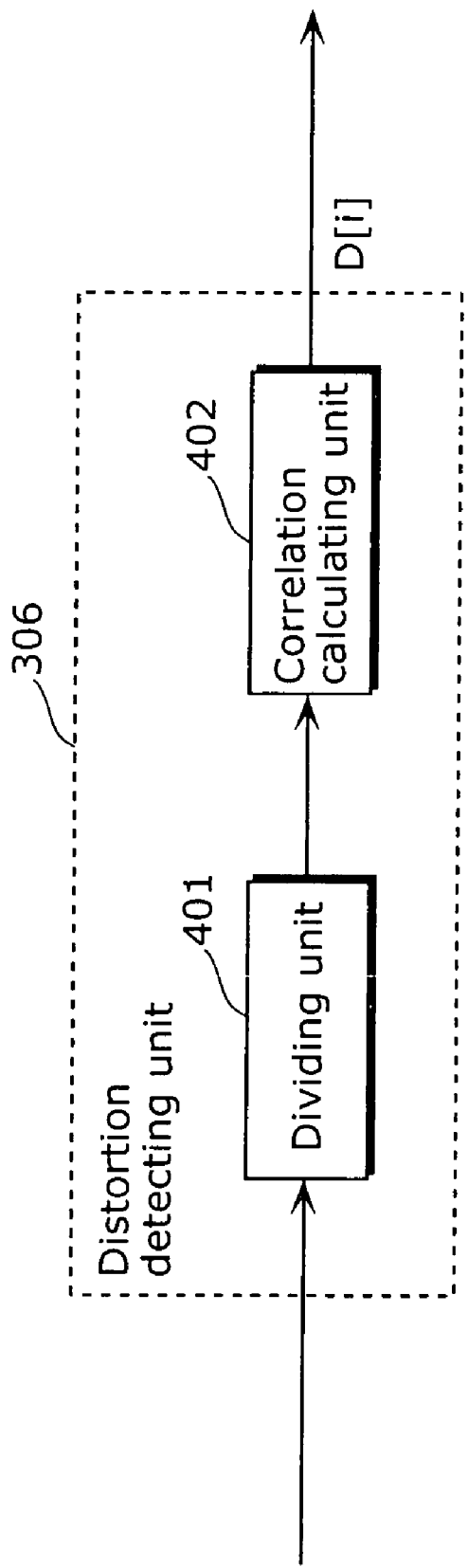
FIG. 4 is a block diagram showing a configuration of a distortion detecting unit shown in FIG. 3 according to the first embodiment.

FIG. 4 is a block diagram showing a configuration of the distortion detecting unit 306 shown in FIG. 3. As shown in FIG. 4, the distortion detecting unit 306 according to the first embodiment includes a dividing unit 401 and a correlation calculating unit 402. The dividing unit 401 divides a picture of one screen (a distortion detecting picture) represented as an input picture signal (Vin), and outputs information indicating how the picture is divided. For each divided unit of the picture, the correlation calculating unit 402 calculates correlation between values of pixels arranged in vertical direction on a per predetermined unit basis (e.g. row-by-row basis, on a per divided unit basis), and detects and outputs a distortion of a line in the vertical direction.

Figure 5:
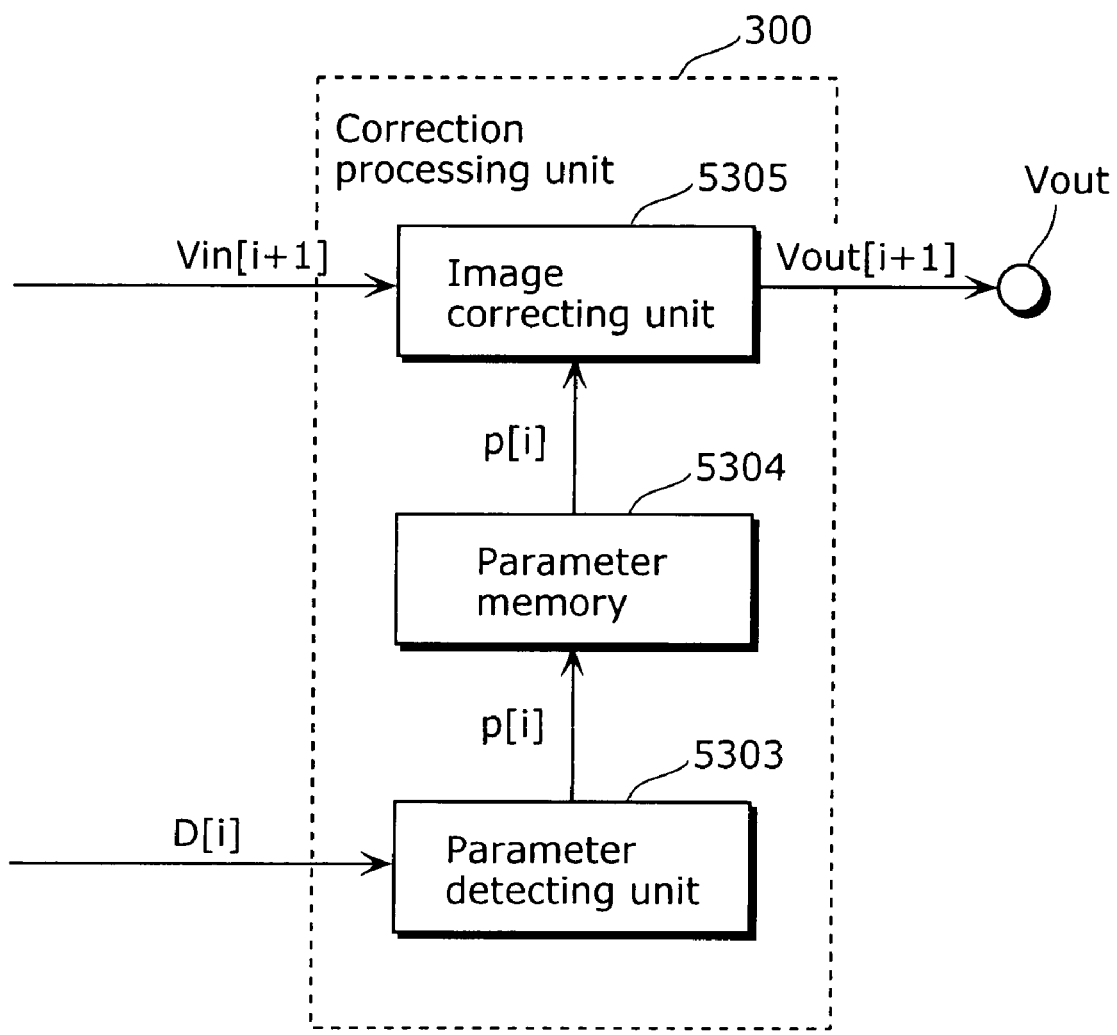
FIG. 5 is a block diagram showing a configuration of a correction processing unit shown in FIG. 3.

FIG. 5 is a block diagram showing a configuration of the correction processing unit 300 shown in FIG. 3. As shown in FIG. 5, the correction processing unit 300 according to the first embodiment includes a parameter detecting unit 5303, a parameter memory 5304 and an image correcting unit 5305.

The parameter detecting unit 5303 accepts the output of the distortion detecting unit 306 derived from the distortion detecting picture (the i th picture), and derives an after-mentioned correction parameter on an image-by-image basis (or on a per divided unit basis). The parameter memory 5304 holds the derived correction parameter and a parameter which is held as an initial value (hereinafter referred to as correction parameter), on a picture-by-picture basis. The image correcting unit 5305 corrects an image (or a divided unit) by applying the aforementioned correction parameter to the picture to be corrected (the [i+1]th picture and a picture subsequent to the [i+1]th picture).

Figure 6:
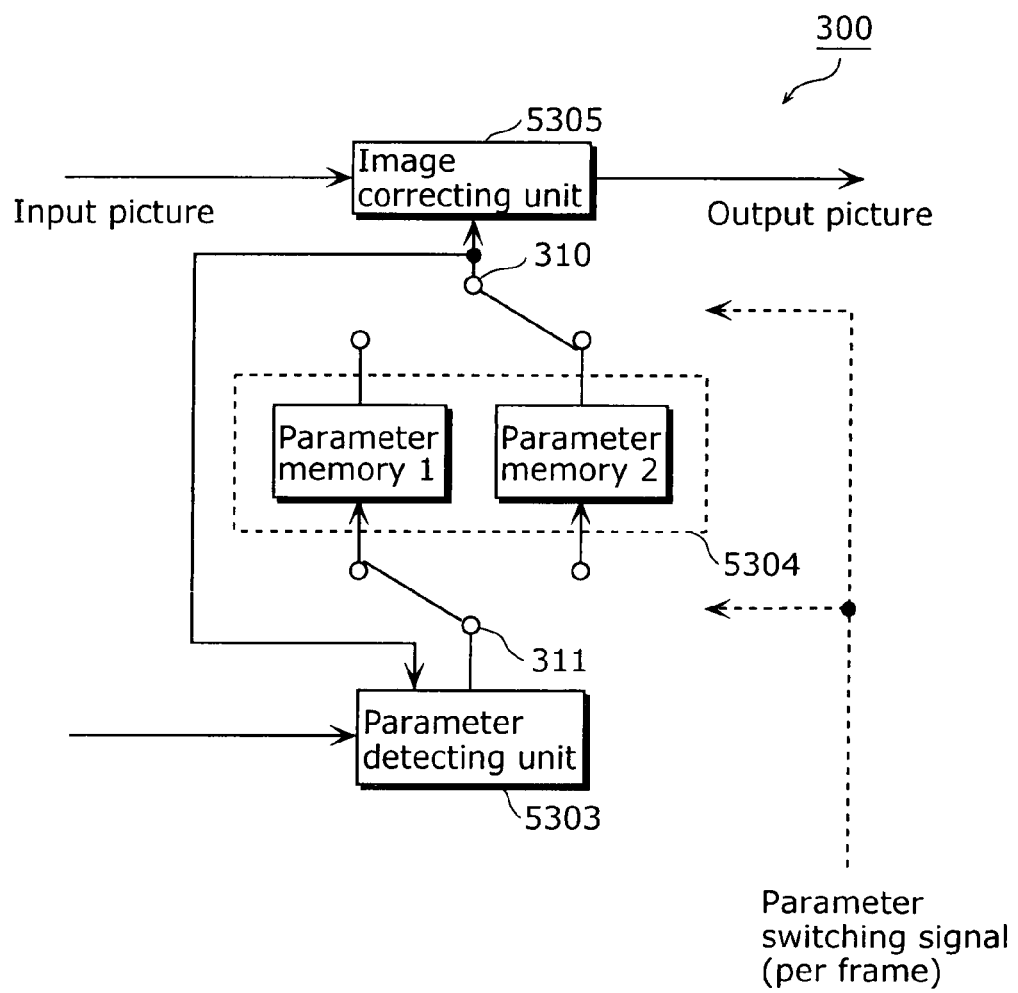
FIG. 6 is a block diagram showing a detailed configuration of the correction processing unit shown in FIG. 5.

FIG. 6 is a block diagram showing a detailed configuration of the correction processing unit 300 shown in FIG. 5. As shown in the figure, the correction processing unit 300 includes the parameter detecting unit 5303, the parameter memory 5304, the image correcting unit 5305 and switches 310 and 311. The parameter detecting unit 5303 detects a parameter used for correcting the distortion calculated by the correlation calculating unit 402 shown in FIG. 4. The parameter detecting unit 5303 stores the detected parameter in one of parameter memories of the parameter memory 5304 that is connected to the switch 311. The parameter memory 5304 holds the stored parameter. The parameter memory 5304 outputs the stored parameter to the image correcting unit 5305 when connected to the image correcting unit 5305 via the switch 310. The image correcting unit 5305 corrects the distortion of the line in the vertical direction by applying the parameter, inputted from the parameter memory 5304, to an input picture.

Note that the parameter memory 5304 includes two parameter memories, namely, a parameter memory 1 and a parameter memory 2 which are switched from one to the other via the switches 311 and 310. The switch 310 and the switch 311 are switched from one to the other in accordance with a control signal from the parameter detecting unit 5303. For example, in the case where a parameter is detected in an initial input picture by the parameter detecting unit 5303, the switch 311 connects the parameter detecting unit 5303 to the parameter memory 1. As a result, the parameter detected by the parameter detecting unit 5303 is stored in the parameter memory 1. During this time, the switch 310 connecting the parameter memory 5304 to the image correcting unit 5305 is controlled by the control signal so as to connect the parameter memory 2 to the image correcting unit 5305. In the parameter memory 2, a parameter for not modifying the image is stored. As a result, the parameter stored in the parameter memory 1 is not applied to the initial input picture from which the parameter is detected, and thus the initial input picture is outputted as it is from the image correcting unit 5305 as an output picture.

Further, when the next parameter detection processing starts, the switch 310 is switched over so as to connect the parameter memory 1 to the image correcting unit 5305. As a result, the parameter stored in the parameter memory 1 is read out by the image correcting unit 5305 and is applied to a current input picture inputted to the image correcting unit 5305. Consequently, the distortion of the line in the vertical direction included in the input picture is corrected and the corrected image is outputted by the image correcting unit 5305. On the other hand, the switch 311 is switched over so as to connect the parameter detecting unit 5303 to the parameter memory 2. As a result, the parameter detected from the distortion signal which is currently in the parameter detecting unit 5303 is stored in the parameter memory 2.

Further, when the next parameter detection processing starts, the switch 310 is switched over so as to connect the parameter memory 2 to the image correcting unit 5305, and the distortion is corrected by applying the parameter stored in the parameter 2.

Note that in the case where it is possible to detect the parameter in real time, it is preferable that the detected parameter is applied to the next picture and, on a picture-by-picture basis, an image in pictures is corrected by applying the parameter obtained from a picture immediately before each picture, however, the present invention is not limited to this. In the case where the detection of a parameter involves many calculations, a parameter detected from an inputted picture may be applied to an image in all the subsequent input pictures for their correction. Further, it is not necessary to continue using until the end the parameter detected from the initially inputted picture, and the distortion of a line in the vertical direction may be corrected by detecting a parameter from every m th picture where m is a predetermined natural number and applying the detected parameter to pictures subsequent to the picture from which the parameter has been detected.

Figure 7:
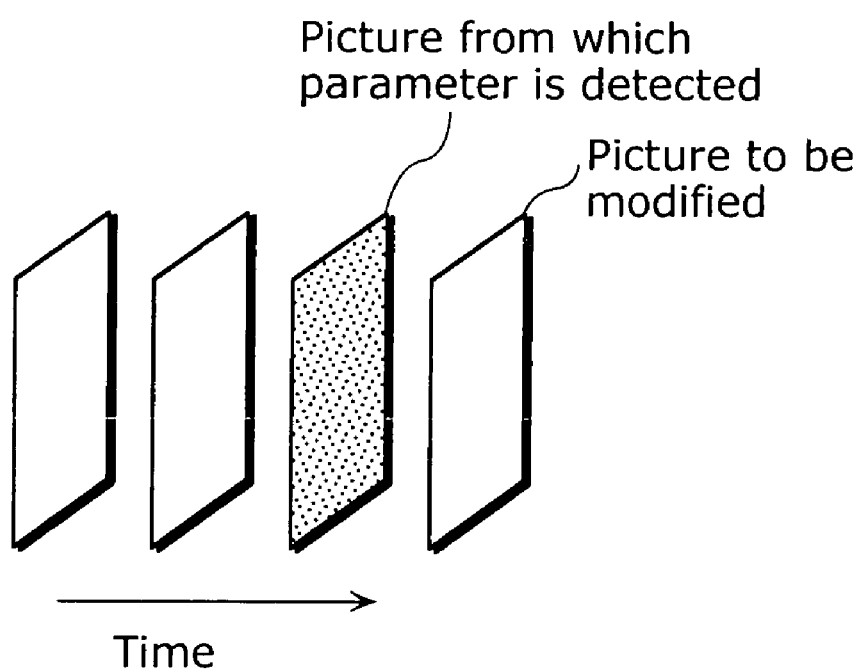
FIG. 7 is a diagram illustrating a relationship between a picture in which a parameter is detected and a picture which is to be modified using the detected parameter, according to the first embodiment.

FIG. 7 is a diagram illustrating a relationship between a picture from which a parameter is detected and a picture which is to be modified using the detected parameter, according to the present embodiment. A moving picture signal includes temporally sequential pictures, and there is a very strong correlation between the sequential pictures. During teleconferences and videophone calls, it is rare that the position and the orientation of the camera 101 and the position of the subject are changed in the sequential pictures. Therefore, it is the idea of the first embodiment that rather than using an "picture to be modified", that is, a picture which is currently shot by the camera 101, an image modifying parameter is detected using an earlier picture as an "picture from which parameter is detected" and that the detected image modifying parameter is applied to the "picture to be modified".

In the distortion detecting unit 306 shown in FIG. 4, the dividing unit 401 divides an input picture into divided units and the correlation calculating unit 402 calculates correlation values. The parameter detecting unit 5303 detects from the correlation values calculated by the correlation calculating unit 402 an image modifying parameter which increases the vertical correlation, and temporarily stores the detected image modifying parameter in the parameter memory 5304. Based on the image modifying parameter read out from the parameter memory 5304, the image correcting unit 5305 performs image modification on the input picture signal (Vin) and outputs the resulting signal as an output picture signal (Vout) having a strong vertical correlation.

Note that although in FIG. 6 it has been described that a signal outputted from the correlation calculating unit 402 of the distortion detecting unit 306 is inputted to the parameter detecting unit 5303, the input picture signal (Vin) may directly be inputted to the parameter detecting unit for the parameter detecting unit to perform the similar processing as the one performed by the correlation calculating unit.

In this case, the parameter detecting unit 5303 corresponds to "a distortion detecting unit operable to detect the distortion of a line in a vertical direction in a distortion detecting picture in which the distortion is detected" and "said distortion detecting unit operable to detect the distortion in a specific picture", and the image correcting unit 5305 corresponds to "a correcting unit operable to correct an image in a picture to be corrected which is inputted subsequent to the distortion detecting picture, so as to eliminate a horizontal shift of the image corresponding to the distortion of the line in the vertical direction detected by said distortion detecting unit" and "said correcting unit operable to correct the image in the picture to be corrected based on the distortion detected in the specific picture prior to the picture to be corrected, the distortion being of the line in the vertical direction, and the picture to be corrected being a picture other than the specific picture in which said distortion detecting unit detects the distortion". Thus, in such a case, it is not prerequisite to include the dividing unit 401.

Figure 8:
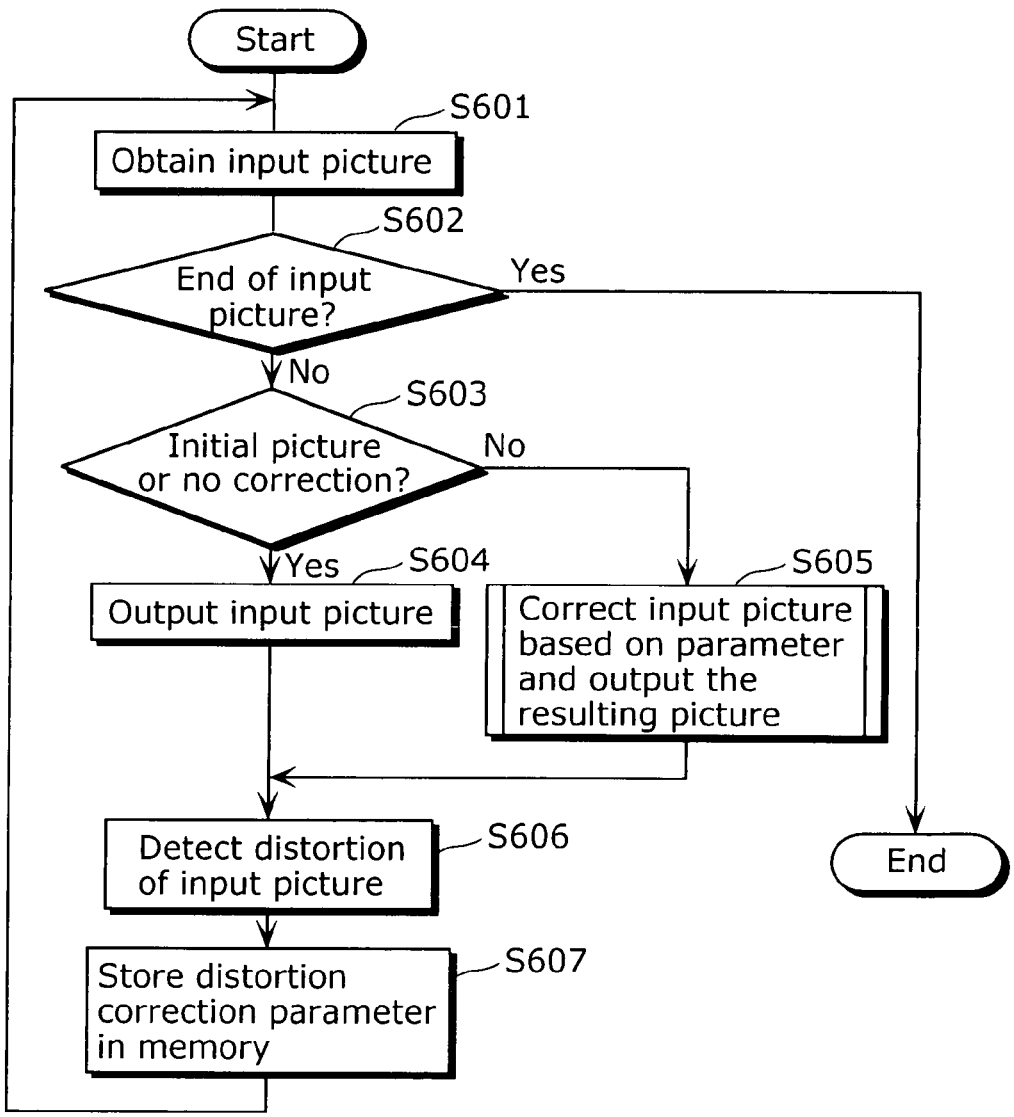
FIG. 8 is a flowchart showing exemplary operations involved in distortion correction processing performed by the image signal processing apparatus according to the first embodiment.

FIG. 8 is a flowchart showing exemplary operations involved in distortion correction processing performed by the image signal processing apparatus according to the first embodiment. First, the image signal processing apparatus obtains an input picture signal (Vin) of an image shot by the camera 101 (S601). Next, the image signal processing apparatus judges whether or not there exists an input picture signal (Vin) which should be processed, in other words, whether or not there exists a picture to be processed that has not yet actually been processed (S602). When such a picture does not exist, the operation is completed. When there exists an input picture signal (Vin) which should be processed, the image signal processing apparatus further judges whether or not the inputted picture is an initial picture or a picture which is not to be corrected (S603). When a judging result of Step 603 shows that the inputted picture is an initial picture or a picture which is not to be corrected, the inputted input picture signal (Vin) is outputted as it is (S604). When a judging result of Step 603 shows that the inputted picture is neither an initial picture nor a picture which is not to be corrected, the image correcting unit 5305 corrects the input picture based on the parameter that is previously detected by the parameter detecting unit 5303 and held in the parameter memory 5304, and outputs the corrected image. Next, the parameter detecting unit 5303 detects a distortion of a line in the vertical direction of an image in the input picture (S606), detects a parameter for correcting the distortion and stores the detected parameter in the parameter memory 5304 (S607). From here on, the image signal processing apparatus returns to the processing of Step 601, and repeats the processing of Step 601 through Step 607 until there are no more input pictures to be processed.

Figure 9:
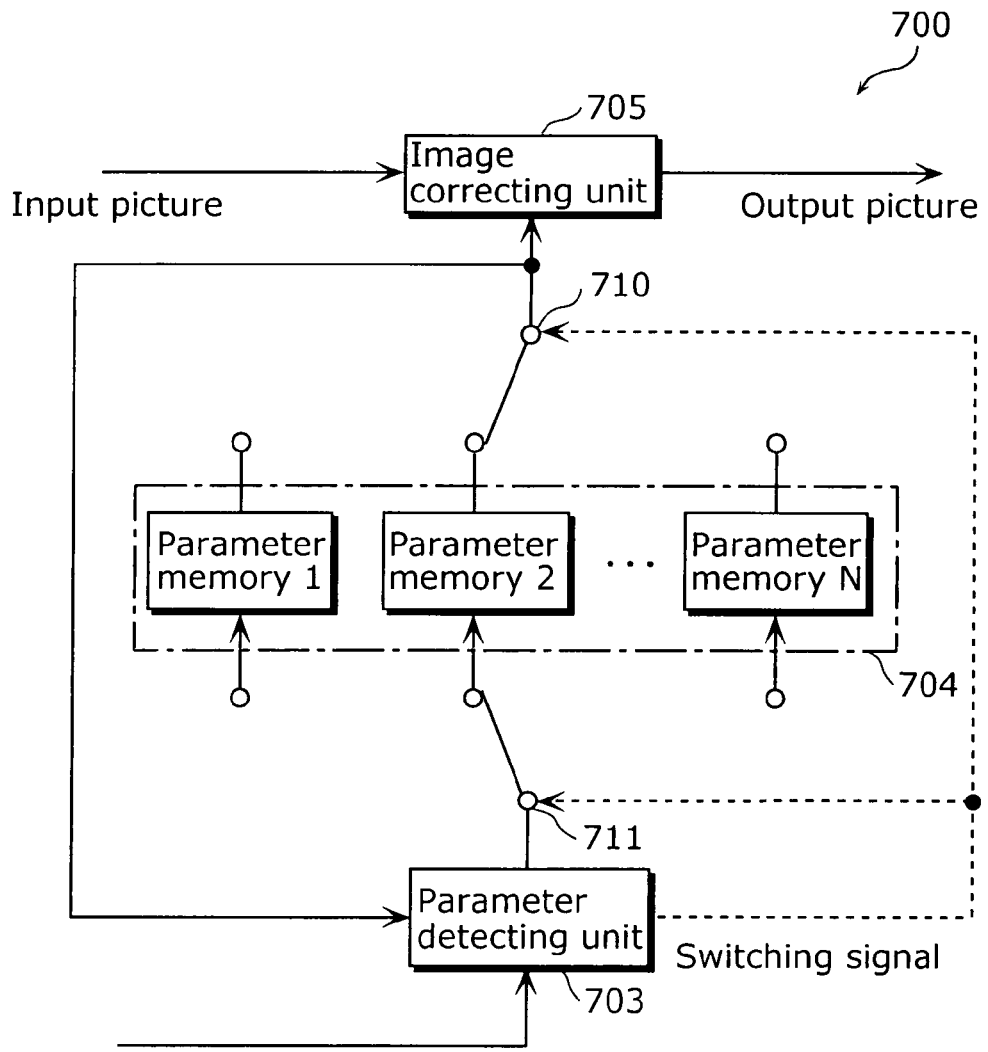
FIG. 9 is a block diagram showing a detailed configuration of a correction processing unit which is an other example of the correction processing unit shown in FIG. 4.

FIG. 9 is a block diagram showing a detailed configuration of a correction processing unit 700 which is an other example of the correction processing unit 300 shown in FIG. 5. With the image signal processing apparatus according to the first embodiment, in the case where plural pictures are corrected using the same parameter, although the background image is almost still, since the input picture signal (Vin) is a moving picture, there is a possibility that correction is overdone on the distortion of the image in the picture or that the correction is insufficient. For this reason, the correction processing unit 700 is included in an image signal processing apparatus which is an other example of the image signal processing apparatus according to the first embodiment. The correction processing unit 700 detects correction parameters of a few pictures (pictures 1, 2 and 3, for example) and stores the respective correction parameters in the parameter memories. When a picture after a few pictures (picture 4, for example) is to be corrected, the correction processing unit 700 corrects the picture using a temporally smoothed correction value, such as an average of the parameters stored up to then (that is, the average of correction parameters of the pictures 1, 2 and 3). Here, a parameter detecting unit 703 corresponds to "said distortion detecting unit operable to detect the distortion in plural specific pictures", and an image correcting unit 705 corresponds to "said correcting unit operable to temporally smooth amounts of correction by averaging amounts of shifts, and correct the image in the picture to be corrected with the temporally smoothed amounts of correction, the picture to be corrected being a picture other than the specific pictures in which said distortion detecting unit detects the distortion, and the amounts of the shifts being detected in the plural specific pictures inputted before the picture to be corrected".

The correction processing unit 700 includes the parameter detecting unit 703, a parameter memory 704, the image correcting unit 705, a switch 710, and a switch 711. The parameter memory 704 includes, for example, N parameter memories, namely, a parameter memory 1, a parameter memory 2, ..., and a parameter memory N (N is a natural number). The parameter detecting unit 703 performs the following: detects an image modifying parameter from each input picture; switches the switch 711; and sequentially stores each of the detected image modifying parameters in the parameter memory 1, the parameter memory 2, ..., and the parameter memory N, respectively. Here, it is not necessary for the parameter detecting unit 703 to detect an image modifying parameter from each picture, and the parameter detecting unit 703 may detect an image modifying parameter from every jth picture where j is a predetermined natural number. For example, it is assumed that a parameter of an initial picture is stored in the parameter memory 1, and a second picture is corrected using the parameter stored in the parameter memory 1. After that, a parameter detected from the second picture is stored in the parameter memory 2, and in sequence, parameters are stored in N parameter memories. For example, in the case where pictures have been corrected up to then using the parameter detected from the initial picture, and when an (N+1)th picture is then to be corrected, the parameter detecting unit 703 sequentially connects the switch 710 to the image correcting unit 705 based on a switching signal, and causes the image correcting unit 705 to read out the parameters stored in the parameter memory 1 through the parameter memory N. The image correcting unit 705 calculates a value such as an average of the N parameters which have been read out from the parameter memory 1 through the parameter memory N, and corrects a distortion of a line in the vertical direction of the image in the (N+1)th picture using the calculated parameter. By doing so, there is an advantage that a distortion of an image which changes little by little can be corrected in an appropriate degree of correction in accordance with a motion of pictures without rapidly causing a significant change in the degree of the correction.

In the present embodiment, the initial picture is a mere picture from which an image modifying parameter is detected, and no image modification processing is performed on the initial picture. Therefore, since the image modifying parameter is calculated using an earlier image, the image modification processing can be performed without a need to temporarily hold the input picture signal (Vin) in a memory and the like. Thus, there is an advantage that a time period from when the input picture signal (Vin) of the initial picture is inputted until the output picture signal (Vout) of the initial picture is outputted can be shortened, and thus a time delay can be shortened. Further, according to the first embodiment, since there is no need to hold the initial picture, it is not necessary to provide a picture memory for image modification processing. Therefore, even when it is necessary to provide the parameter memory 5304 for storing an image modifying parameter, since the capacity of the parameter memory 5304 is less than the capacity of the picture memory for storing an image (a picture of one frame or of one field), there is an advantage of economizing on the memory capacity.

Figures 10A, 10B:
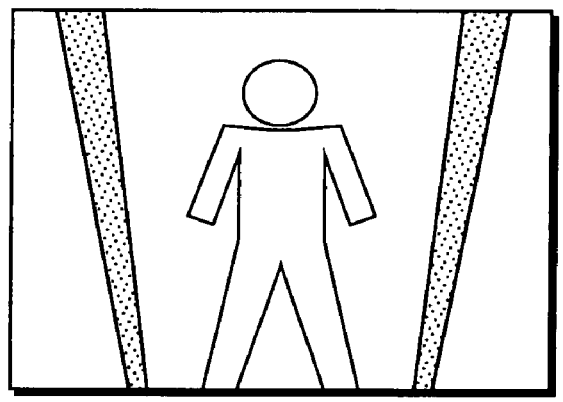
FIGS. 10A and 10B are diagrams showing an exemplary picture divided in order to calculate vertical correlation of an input picture signal (Vin).

FIGS. 10A and 10B are diagrams showing an exemplary picture divided by the dividing unit 401 in order to calculate vertical correlations of an input picture signal (Vin). FIG. 10A shows an exemplary picture for which correlations are calculated. FIG. 10B shows an exemplary picture shown in FIG. 10A divided into divided units. Although in the figure, the picture is horizontally divided into 2 and is vertically divided into 8, the figure merely shows an example, and it is also possible to horizontally divide the picture into 2 or more and vertically divide the picture into 8 or more. Ideally, it is preferable that the picture is vertically divided at each row. Here, the divided units are referred to as L0 to L7 and R0 to R7.

For each divided unit, while shifting pixel values on a horizontal row by one pixel at a time in a horizontal direction, the correlation calculating unit 402 calculates correlation values between pixel values in the vertical direction corresponding to each of the shifted amounts. The horizontal width for calculating the correlation values is assumed to be a few pixels. More specifically, for each of the divided units L0 to L7 and R0 to R7, vertical correlation values between the values of the pixels arranged on rows that are vertically adjacent to each other are calculated.

Figure 11:
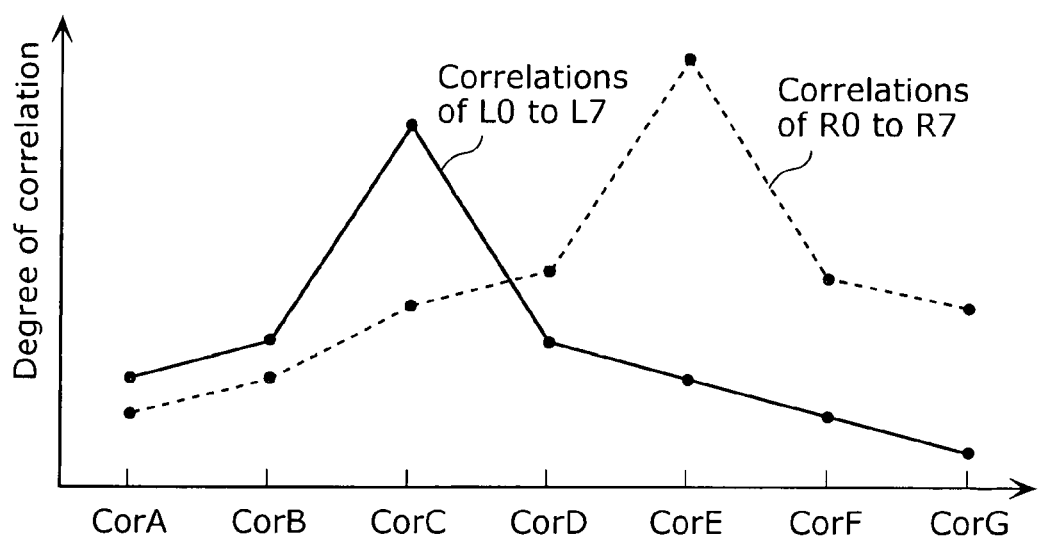
FIG. 11 is a graph showing exemplary correlations of the divided units of a picture, namely, L0 to L7 and R0 to R7, when calculating vertical correlation values between values of pixels arranged on rows that are vertically adjacent to each other.

FIG. 11 is a graph showing exemplary correlations, for the divided units of a picture L0 to L7 and R0 to R7, in the case where vertical correlation values between values of pixels arranged on rows that are vertically adjacent to each other are calculated. A correlation value CorD is a correlation value derived by shifting the value of a pixel on a target row in a horizontal direction and calculating a correlation value between the shifted pixel value in the row and the value of a pixel just above the pixel in the row. Correlations values CorA to CorC are derived by shifting the values of pixels on a target row to the left by 3 to 1 pixels, and calculating vertical correlation values. Correlations CorE to CorG are derived by shifting the values of pixels on a target row to the right by 1 to 3 pixels, and calculating vertical correlation values. Here, for example, for each of the divided units L0 to L7 and R0 to R7, vertical correlations of pairs of two rows adjacent to each other are sequentially calculated from the top. By shifting, from the top to the bottom, the pair of two rows by one row at a time, vertical correlations of all the pairs of two rows in each of the divided units are calculated. Further, for example, vertical correlation values are calculated for all the pairs of two rows in each of the divided units and then the sum of the calculated vertical correlation values in each divided unit is referred to as a vertical correlation of the divided unit. In this example, among the correlation values of the divided units L0 to L7, the correlation value CorC, derived when the values of the pixels in a target row are shifted to the left by one pixel, is the greatest, and among the correlation values of the divided units R0 to R7, the correlation value CorE, derived when the values of the pixels in a target row are shifted to the right by one pixel, is the greatest. This indicates that the divided units L0 to L7 are shifted to the right from their vertical state, and that the divided units R0 to R7 are shifted to the left from their vertical state.

It is assumed that values in the right direction are positive values and values in the left direction are negative values, and that the correlation values reach their peak when the divided units L0 to L7 are shifted to the left by XL pixels and the divided units R0 to R7 are shifted to the right by XR pixels. Also, when the number of pixels in the horizontal direction in the divided units L0 to L7 and R0 to R7 is assumed to be W, it is possible to modify the image to have a strong vertical correlation by performing image correction that shifts the values of the pixels which are at the pixel position X in the row (X is no less than 0 and below 2W when the pixel position at the left end of the row is assumed to be 0) by the amount of (XR−XL)(X−W/2)/W+XL.

More specifically, from the above expression, the image is corrected by shifting the values of the pixels which are at the position where X=W/2 in the divided units L0 to L7 by XL pixels and shifting the values of the pixels which are at a position where X=3W/2 in the divided units R0 to R7 by XR pixels. At other positions, the image is corrected by prorating the shifted amount in accordance with a distance in the X direction from the position where X=W/2.

For example, as shown in the above example, when it is assumed that the pixels in the divided units L0 to L7 are shifted to the left by one pixel (in other words, XL is −1) and that the pixels in the divided units R0 to R7 are shifted to the right by one pixel (in other words, XR is 1), the vertical distortion is eliminated by shifting the pixels to the right by pixels of (1−(−1))(X−W/2)/W−(1)=2X/W−2.

Note that it is simple to set XL of each of the divided units L0 to L7 to be the average of shifted amounts where the vertical correlations become great and set XR of each of the divided units R0 to R7 to be the average of shifted amounts where the vertical correlations become great, however, it is not necessary to calculate the averages, and instead, modes, medians or the like may be used. Further, for the correction performed by shifting the values of pixels which are at the pixel position X by a calculated shifted amount, the values of the pixels may be shifted not only by an integer number of pixels, but also by a shifted amount equivalent to a decimal number of pixels by pixel interpolation using an inter-pixel filter and the like, as in the case of motion detection and motion compensation.

The parameter detecting unit 5303 calculates, from the vertical correlation values CorA to CorG calculated by the correlation calculating unit 402, shifted amounts XR and XL which are shifting amounts (parameters) by which the values of pixels are shifted for correcting each pixel. The image correcting unit 5305 corrects the image based on the shifting amounts (parameters) XR and XL calculated by the parameter detecting unit 5303, and outputs an output picture signal (Vout).

Here, the correlation calculating unit 402 corresponds to "a vertical correlation calculating unit operable to calculate, for plural amounts of shifts, correlations between values of pixels that are arranged on at least two horizontal rows of the distortion detecting picture, the pixels having an amount of the horizontal shift equal to each other and being in a relative positional relationship with each other", and the image correcting unit 5305 corresponds to "said correcting unit operable to correct the image in the picture to be corrected such that the values of the pixels are shifted to an opposite direction by the amount of the horizontal shift at which a degree of correlation is at its peak, the degree of correlation being represented by the correlation calculated from said distortion detecting picture".

Figure 12:
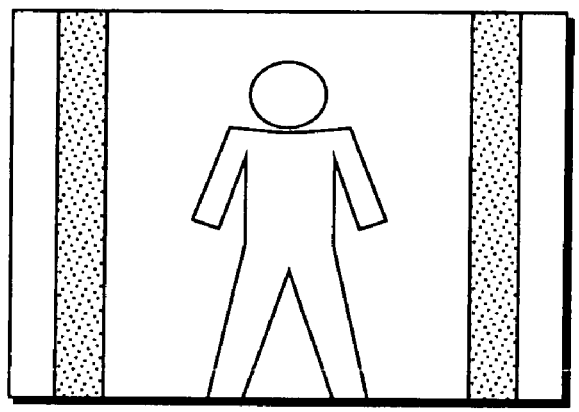
FIG. 12 is a diagram showing an exemplary image obtained by correction performed by the image signal processing apparatus according to the present invention.

FIG. 12 is a diagram showing an exemplary image obtained by correction performed by the image signal processing apparatus according to the present invention. As described above, the image in which a part that should be vertical is distorted when shot as shown in FIG. 2 is corrected as shown in FIG. 12 by being modified by the image signal processing apparatus according to the present invention. Note that by sequentially performing this process on each of the rows with a corrected row as a row to be just above a target row, the whole picture can be corrected.

Figure 13B:
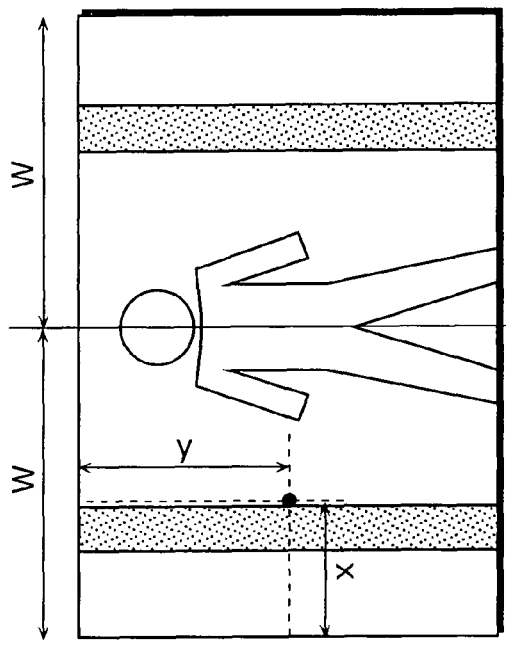
FIGS. 13A and 13B are diagrams showing an exemplary method of correcting an image distortion on a picture-by-picture basis using X-Y coordinates.
Figure 13A:
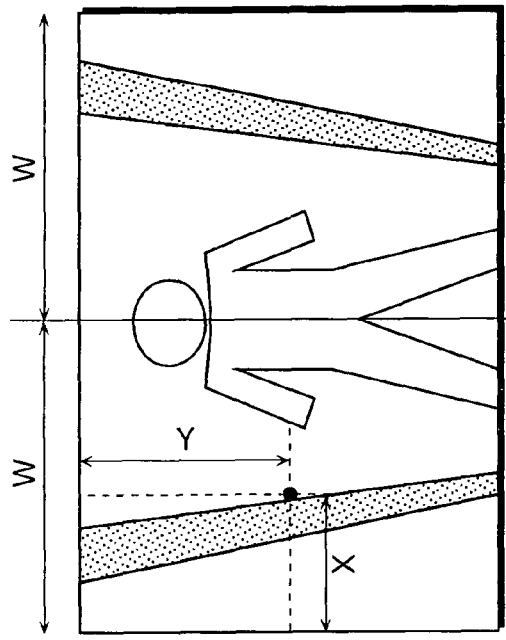

Next, a method for correction on a picture-by-picture basis, instead of on a row-by-row basis, shall be described. FIGS. 13 and 13B are diagrams showing an exemplary method of correcting an image distortion on a picture-by-picture basis using X-Y coordinates. FIG. 13A shows an input picture signal (Vin) which is to be corrected, and FIG. 13B shows a corrected picture. As shown in the figures, when it is assumed that: the width of one picture is 2W; the upper left corner of the picture is (X, Y)=(0, 0); and a shift XL between rows which are vertically adjacent to each other before the picture is corrected is constant within the picture, it can also be assumed that XL (Y), that is, XL for the Y th row, is proportional to vertical coordinates and thus can be expressed as below.

XL(Y)=a·Y+b

Thus, as shown below, a and b can be detected using XL (Y+1), that is, XL for the (Y+1)th row.

a=XL(Y+1)−XL(Y)

b=XL(Y)−Y{XL(Y+1)−XL(Y)}

By calculating a and b for even-numbered rows and calculating on a picture-by-picture basis the average of a and b, that is, a_ave and b_ave, XL for the Y th row can be detected using the following expression.

XL(Y)=a_ave·Y+b_ave

The similar approach applies to XR for the Y th row.

c=XR(Y+1)−XR(Y)

d=XR(Y)−Y{XR(Y+1)−XR(Y)}

XR(Y)=c_ave·Y+d_ave

Using these expressions, pre-correction pixel positions X and Y which correspond to post-correction coordinate positions (x, y) can be obtained using the following expression.

$$x = (XR(Y) - XL(Y))(X\_W/2)/W + XL(Y) \qquad \text{(Expression A)}$$
$$= \{(c\_ave \cdot Y + d\_ave) - (a\_ave \cdot Y + b\_ave)\}$$
$$(X\_W/2)/W + \{a\_ave \cdot Y + b\_ave\}$$
$$= \{(c\_ave - a\_ave)Y + (d\_ave - b\_ave)\}$$
$$(X\_W/2)/W + \{a\_ave \cdot Y + b\_ave\}$$
$$y = Y$$

Figure 14:
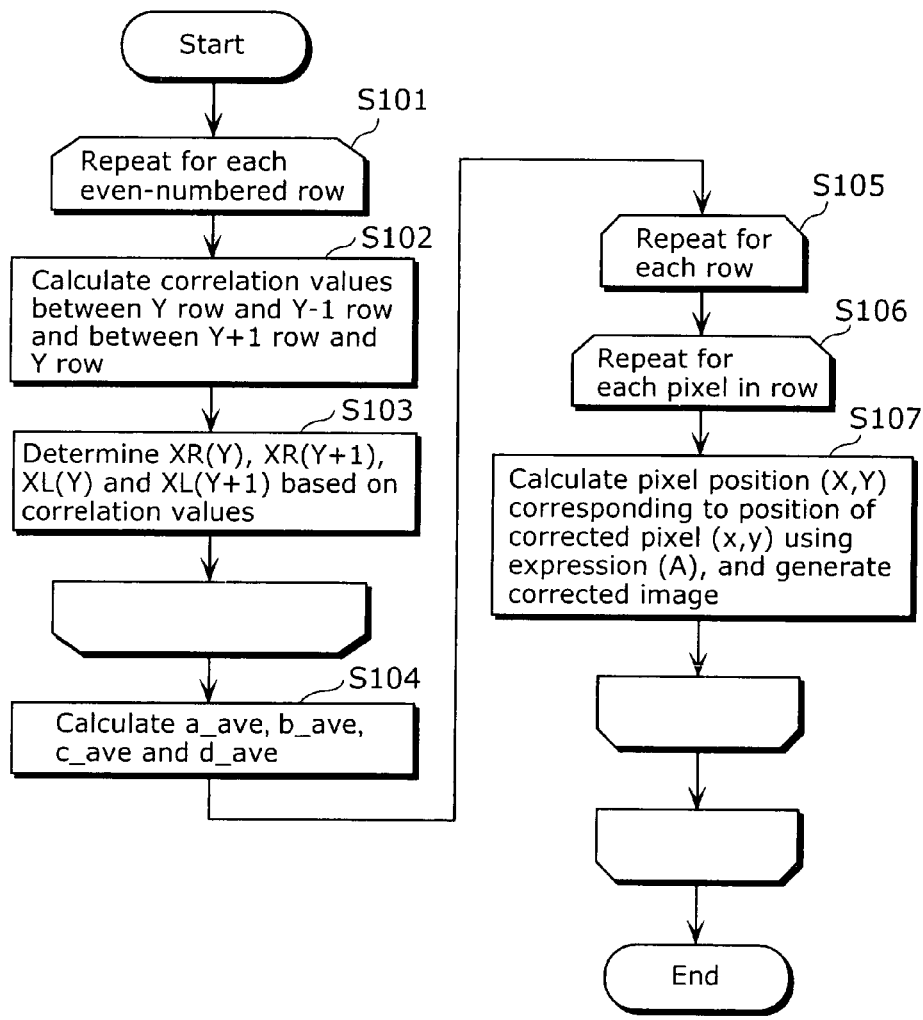
FIG. 14 is a flowchart showing exemplary calculation steps involved in correcting an image on a picture-by-picture basis.

FIG. 14 is a flowchart showing exemplary calculation steps involved in correcting an image on a picture-by-picture basis. With the above described calculation method, the correlation calculating unit 402 calculates, for example, correlation values CorA to CorG between upper two rows and between lower two rows among three rows with an even-numbered row in the middle (S102), and the parameter detecting unit 5303 calculates a position where the vertical correlation is great, based on a shifted amount between the upper two rows and a shifted amount between the lower two rows. The correlation calculating unit 402 and the parameter detecting unit 5303 calculate, for each even-numbered row, the correlation values CorA to CorG between the upper two rows and between the lower two rows among three rows with the even-numbered row in the middle, starting from the top row of the picture by repeating the above described processes in Step S103 and Step S102 for each even-numbered row (S101). Then, from the calculated correlation values CorA to CorG, equations for a straight line in the vertical direction, that is, XL (Y)=a·Y+b and XR (Y)=c·Y+d are solved, and averages of coefficients of the equations for the straight line, that is, a_ave, b_ave, c_ave, and d_ave are calculated (S104). As a result, it is possible to obtain the equations for the straight line in the vertical direction within one picture, that is, XL (Y)=a_ave_Y+b_ave and XR (Y)=c_ave Y+d_ave, and thus from the obtained equations, the image correcting unit 5305 corrects an image within the picture so as to make the straight line vertical. More specifically, using the expression A, the image correcting unit 5305 calculates the value of a pixel which is at the post-correction pixel position (x, y) based on the pre-correction pixel position (X, Y) (S107). The image correcting unit 5305 corrects an image of one picture by repeating on a pixel-by-pixel basis (S106) the process in Step S107 for each row which has been corrected (S105).

Figure 15:
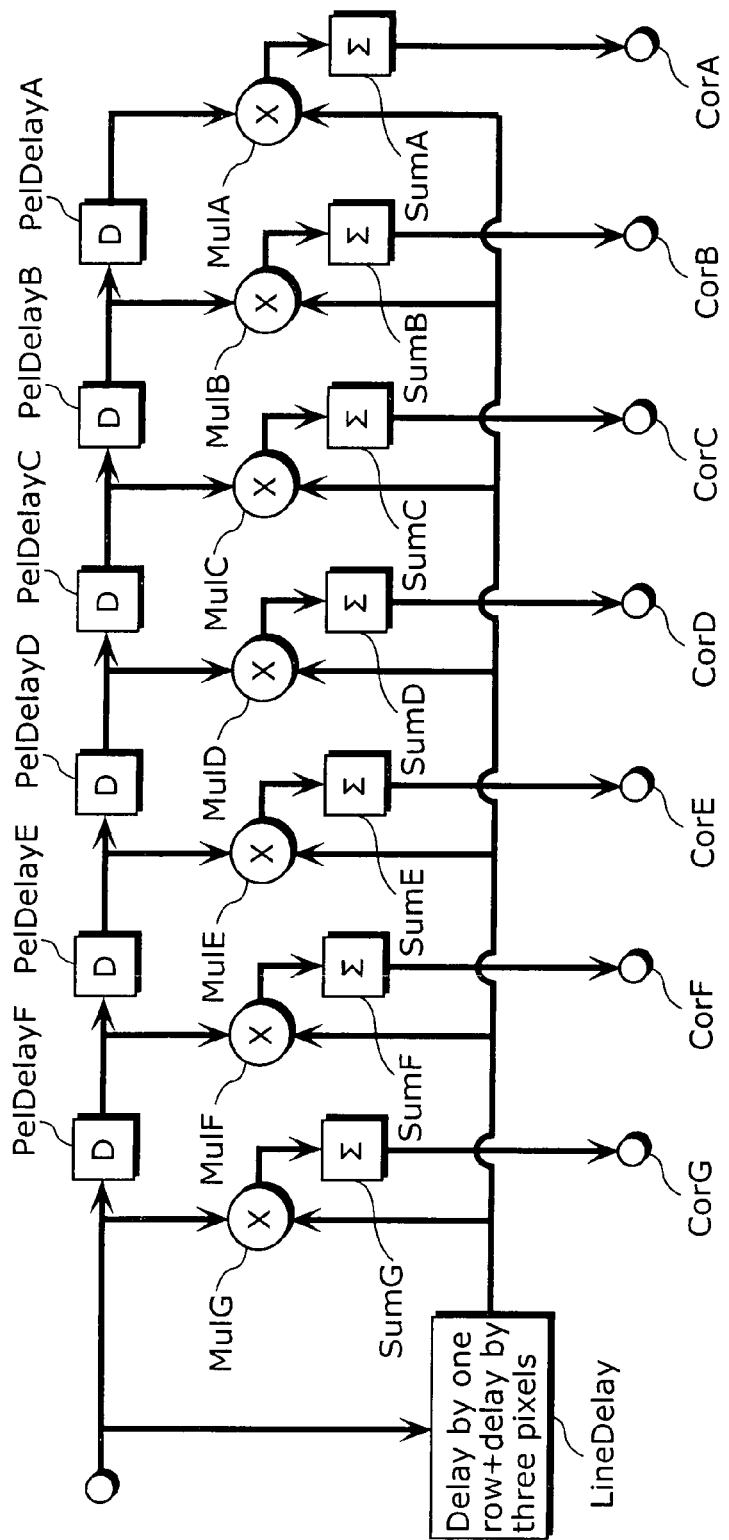
FIG. 15 is a block diagram showing an exemplary configuration of a correlation calculating unit shown in FIG. 3.

FIG. 15 is a block diagram showing an exemplary configuration of the correlation calculating unit 402 shown in FIG. 3. Pixel delay devices (PelDelayA to PelDelayF) delay an inputted picture signal by one pixel, and a row delay device (LineDelay) delays the inputted picture signal by one row and three pixels. Therefore, the output of the row delay device (LineDelay) is shifted from the output of the pixel delay device (PelDelayD) by one row. Similarly, the output of the row delay device (LineDelay) is shifted from the output of the pixel delay device (PelDelayE) by one row minus one pixel, that is, by one row and one pixel to the left. The output of the row delay device (LineDelay) is multiplied by the inputted picture signal and by each of the outputs of the pixel delay devices PelDelayA to PelDelayF by multipliers MulA to MulG, respectively. For each divided unit, a cumulative sum of the values calculated by the multipliers (MulA to MulG) is calculated by accumulators (SumA to SumG). The calculated cumulative sums are respectively referred to as the correlation values CorA to CorG. In other words, each of the correlation values CorA to CorG can be expressed as a sum of a correlation value between a first row and a second row, a correlation value between the second row and a third row, a correlation value between the third row and a fourth row, . . . , a correlation value between an (H−2)th row and an (H−1)th row within each of the divided units.

Here, the correlation calculating unit 402 corresponds to "said vertical correlation calculating unit operable to calculate, for each of the amounts of the shifts, a product sum of the values of the pixels that are arranged on the horizontal rows".

Figure 16:
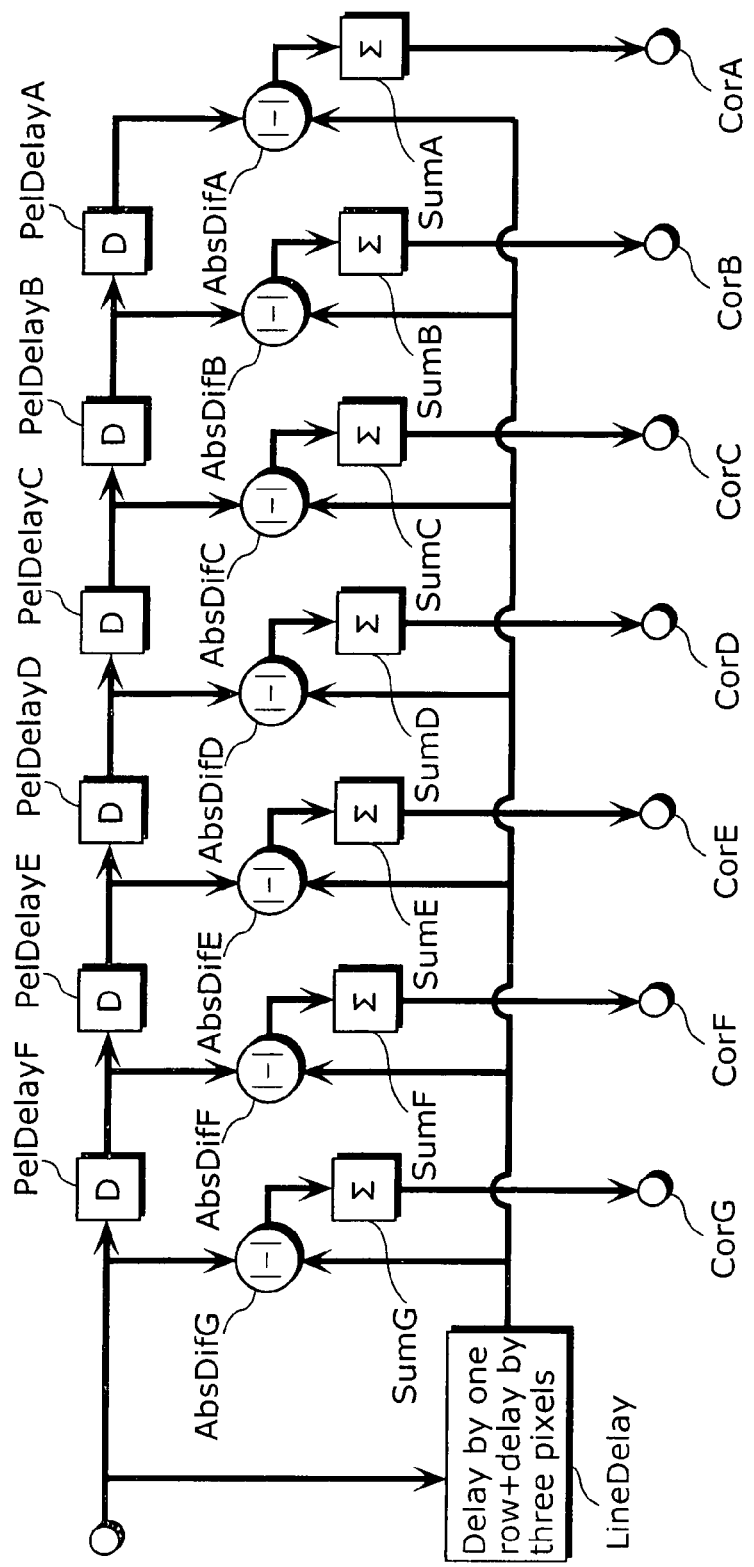
FIG. 16 is a block diagram showing an exemplary configuration of a correlation calculating unit for which absolute difference devices (AbsDifA to AbsDifG) are used instead of multipliers (MuIA to MuIG) shown FIG. 15.
Figure 17:
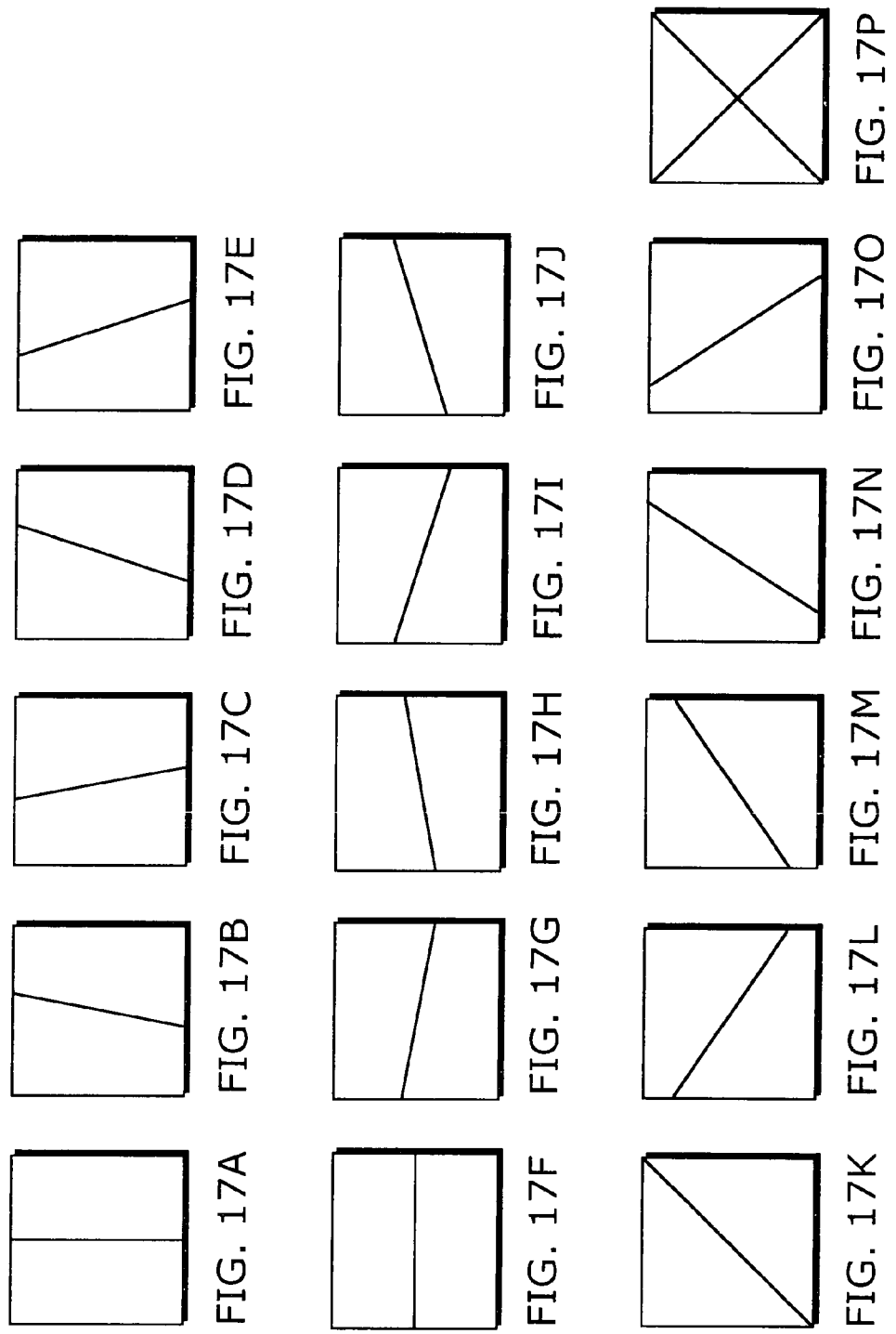
FIGS. 17A through 17P are diagrams showing exemplary patterns of a straight line included in an image.

Note that instead of performing multiplications of the values of the pixels arranged on two rows adjacent to each other by the multipliers (MulA to MulG) as shown in FIG. 15, absolute differences may be calculated by absolute difference devices (AbsDifA to AbsDifG) which involve an easier calculation. FIG. 16 is a block diagram showing an exemplary configuration of the correlation calculating unit 402 for which the absolute difference devices (AbsDifA to AbsDifG) are used instead of the multipliers (MulA to MulG) shown in FIG. 15. As in the configuration shown in FIG. 15, each of the pixel delay devices (PelDelayA to PelDelayF) delays an input picture signal (Vin) by one pixel, and the row delay device (LineDelay) delays the input picture signal (Vin) by one row and three pixels. The absolute difference devices (AbsDifA to AbsDifG) output absolute differences between: the input picture signal (Vin) and each of the outputs of the pixel delay devices (PelDelayA to PelDelayF); and the output of the row delay device (LineDelay), respectively. Each of the accumulators (SumA to SumG) calculates a cumulative sum of the absolute differences of one of the divided units. However, in this case, the smaller the correlation values CorA to CorG, the greater the correlation becomes. Thus, this case differs from the case of FIG. 15 where the greater the correlation values CorA to CorG, the greater the correlation becomes. In the present specification, the following description is based on the case of FIG. 15 where the greater the correlation values CorA to CorG, the greater the correlation becomes. Thus, attention should be paid that in the case shown in the block diagram of FIG. 16 showing how a correlation is calculated according the present invention, the understanding of great/small correlation is opposite.

Here, the correlation calculating unit 402 corresponds to "said vertical correlation calculating unit operable to calculate, for each of the amounts of the shifts, a sum of absolute differences between the values of the pixels that are arranged on the horizontal rows".

In FIG. 15 and FIG. 16, the amount of computation increases in proportion to the number of detected shifts, however, a large number of detected shifts are not needed since the number of shifts by rows is very small. Further, in the case where the vertical correlation is shifted due to a problem with a position of the camera, it can be considered that the shift from the vertical position is not extremely significant. Thus, taking into consideration that the range of the correlation value which needs to be calculated by the correlation calculating unit 402 (the range of shifts of horizontal pixels) is narrow, it is considered that precision necessary for image correction is sufficient even when the number of detected shifts is reduced so as to reduce the amount of calculation performed by the correlation calculating unit 402.

FIGS. 17A through 17P are diagrams showing exemplary patterns of a straight line included in an image. FIG. 17A shows a pattern in which the straight line is perfectly vertical. FIG. 17B to FIG. 17E show patterns in which the straight line is nearly vertical. The patterns shown in FIG. 17A to FIG. 17E are patterns in which a correlation can be calculated to be expressed as a correlation value Cor. On the other hand, for patterns shown in FIG. 17F to FIG. 17J in which the straight line is nearly horizontal and patterns shown in FIG. 17K to FIG. 17P in which the straight line is neither vertical nor horizontal, the peak of the correlation cannot be detected to be expressed as a correlation value Cor. In such a case where the peak cannot be detected, a correlation value Cor which becomes the peak correlation becomes small. Therefore, in the case where the peak correlation value Cor is small, the precision of image correction can be improved by choosing not to use the correlation value Cor for the image correction and thus excluding, from calculation for the image correction, a pattern in which a vertical correlation is originally not included.

Figure 18:
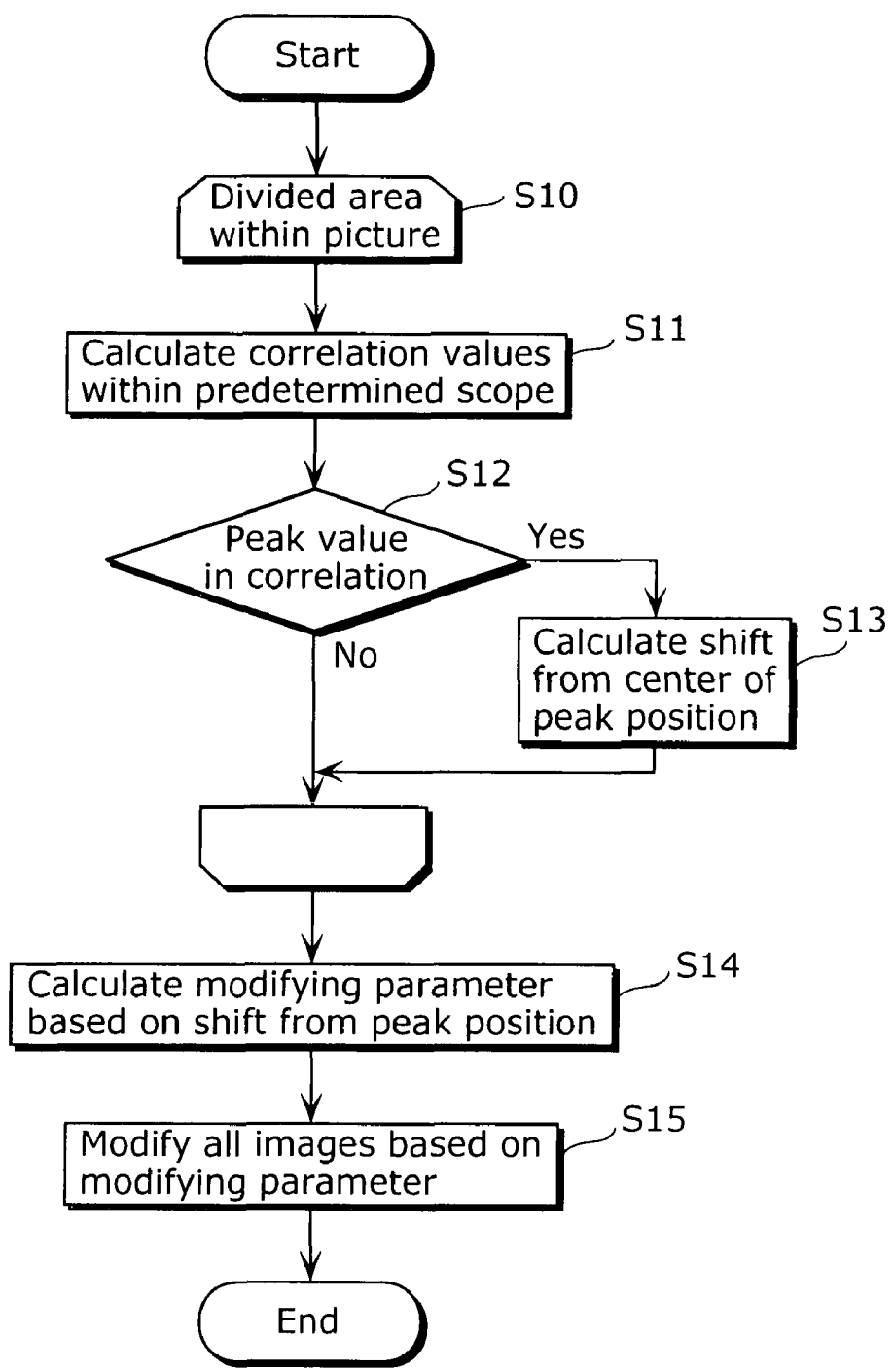
FIG. 18 is a flowchart showing steps involved in an image signal processing method performed by the image signal processing apparatus according to the present invention.

FIG. 18 is a flowchart showing steps involved in an image signal processing method performed by the image signal processing apparatus of the present invention. The correlation calculating unit 402 calculates correlation values within a divided area (a predetermined range) (S11), and judges whether or not there is a peak value in the calculated correlation values (S12). In the case where there is a peak value, a shift of the peak position from the center position is calculated (S13). The calculation of the correlation values and the calculation of the shift of the peak position from the center position are performed for each divided area within an image.

After the above described processes are performed for each divided area within the image, an image modifying parameter used for bringing the peak value to the center between the right and left divided areas is calculated (S14). By modifying all the images using the calculated image modifying parameter (S15), modified images which are corrected to have strong vertical correlations can be obtained.

Figure 19:
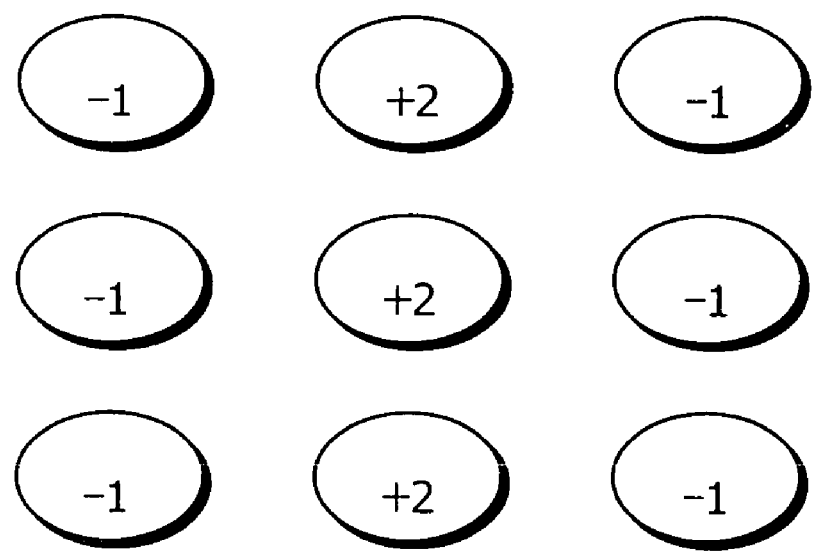
FIG. 19 is a diagram showing a simple exemplary pixel filter used for computation for edge detection.

Note that according to the above described embodiment, the correlation calculating unit 402 calculates vertical correlation values CorA to CorG between rows that are vertically adjacent to each other, and calculates a shifted amount of an image to be corrected from the peak values of the calculated correlation values CorA to CorG. However, the present invention is not limited to this, and an other method may be employed to calculate a shifted amount of an image. For example, a line in the vertical direction may be detected using a conventional edge detection technique in order to correct the tilt of the line. A filter used for edge detection is a filter used for multiplying, for example, each of the values of pixels in three rows and three columns by one of the following coefficients, and calculating a sum of products for each column and each row. FIG. 19 is a diagram showing a simple exemplary pixel filter used for a computation for edge detection. The numbers in circles shown in the figure indicate coefficients by which the values of pixels located at corresponding positions are multiplied. To be more specific, for the pixels in the first row, the value of the pixel located at the position (1, 1) is multiplied by (−1). The value of the pixel located at the position (1, 2) is multiplied by (+2). Moreover, the value of the pixel located at the position (1, 3) is multiplied by (−1). A sum of the products is zero, given that each of the pixel values is the same. The similar approach applies to the pixels in the second and third rows. With columns, as long as none of the pixel values is zero, there is a value for every row. In other words, in the case where there is a line having the same pixel values (brightness) in the vertical direction, when the above described filter is used, a sum of products in a column is different for each row, but a sum of products in the horizontal direction which is vertical to the line becomes zero. By applying the above calculations to all the pixels in a picture, a line in the vertical direction can be detected. Further, variously angled lines can be detected by applying such a filter with a different degree. Therefore, by detecting a line angled within a fixed range of degrees with respect to the vertical direction and correcting the angled line to be vertical, it is possible to obtain a desired image.

Note that according to the above described embodiment, the correlation values CorA to CorG are calculated for each picture in order to correct the image, however, the present invention is not limited to this. Correlation values CorA to CorG may be calculated for pictures at a regular interval, and images of subsequent pictures may be corrected based on the calculation result. For example, a shifted amount may be calculated by calculating correlation values CorA to CorG every 5 to 10 minutes or every time the image signal processing apparatus is activated.

Further, according to the above described embodiment, image modification is performed on an input picture signal (Vin) of one picture using a parameter detected from one picture, however, it is not necessary to have a one to one relationship. For example, a shifted amount calculated from a past picture may be prorated to subsequent plural pictures so as to correct the plural images. The shifted amount is prorated by multiplying the shifted amount by a weighting coefficient in accordance with a temporal distance between the picture from which the shifted amount is detected and the picture which is to be modified. By doing so, there is an advantage that by modifying pictures starting from the picture from which the parameter is detected, an image, in which the straight line that should be vertical is corrected to be vertical, is displayed without giving an unnatural impression on the users. Further, parameters may be detected from plural pictures, and using an average of the detected parameters, a distortion of a line in the vertical direction within a subsequent picture may be corrected. As a result, there is an advantage that the distortion of the image can be corrected with high precision since an impact of a temporal change (noise) which occurs when a person walks pass the camera, for example, is reduced.

Moreover, according to the above described embodiment, correlation values CorA to CorG are calculated between rows that are adjacent to each other, however, it is not necessary to calculate the correlation values CorA to CorG between the rows that are adjacent to each other. Instead, correlation values CorA to CorG may be calculated between a row and every other row or between a row and every fourth row, for example.

Second Embodiment

Figure 20:
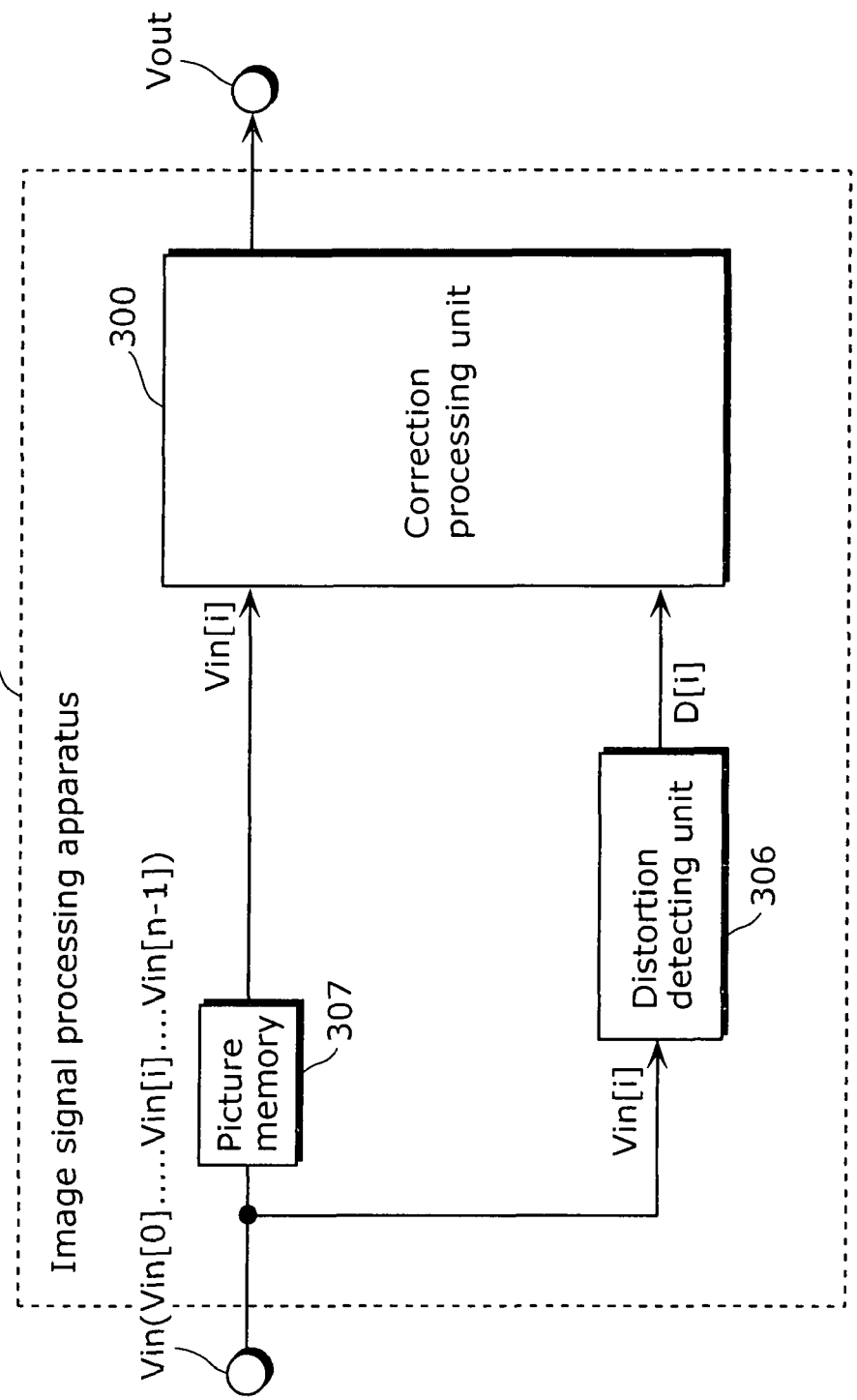
FIG. 20 is a block diagram showing a configuration of an image signal processing apparatus according to a second embodiment.

FIG. 20 is a block diagram showing a configuration of an image signal processing apparatus 4000 according to a second embodiment of the present invention. The image signal processing apparatus 4000 according to the second embodiment is the same as the image signal processing apparatus 3000 according to the first embodiment in that a vertical correlation of an input picture signal (Vin) is calculated and that an output picture is generated by modifying the input picture signal (Vin) so that the calculated correlation becomes the maximum correlation. However, the image signal processing apparatus 4000 is an apparatus which performs the following: stores in an image memory an input picture signal (Vin[i]) of an i th picture which is to be displayed; calculates an image modifying parameter from the stored input picture signal (Vin[i]); and outputs an image in which a distortion of a line in the vertical direction is corrected by applying the image modifying parameter to the stored input picture signal [i] as well. The image signal processing apparatus 4000 includes a picture memory 307, a correction processing unit 300 and a distortion detecting unit 306. The picture memory 307 is a memory for storing image data on a picture-by-picture basis, and for example, the input picture signal (Vin [i]), that is, the i th picture, is temporarily stored in the memory while a processing parameter used for performing image modification on the picture is detected. Once the processing parameter for image modification is detected from the input picture signal (Vin[i]), that is, the i th picture, the input picture signal (Vin[i]) which has been stored in the memory is inputted to the correction processing unit 300. The correction processing unit 300 corrects a distortion of the line in the vertical direction by applying the detected processing parameter for image modification, and outputs an output picture (Vout[i]) of the input picture signal (Vin[i]) which is the i th picture.

Third Embodiment

Figure 21:
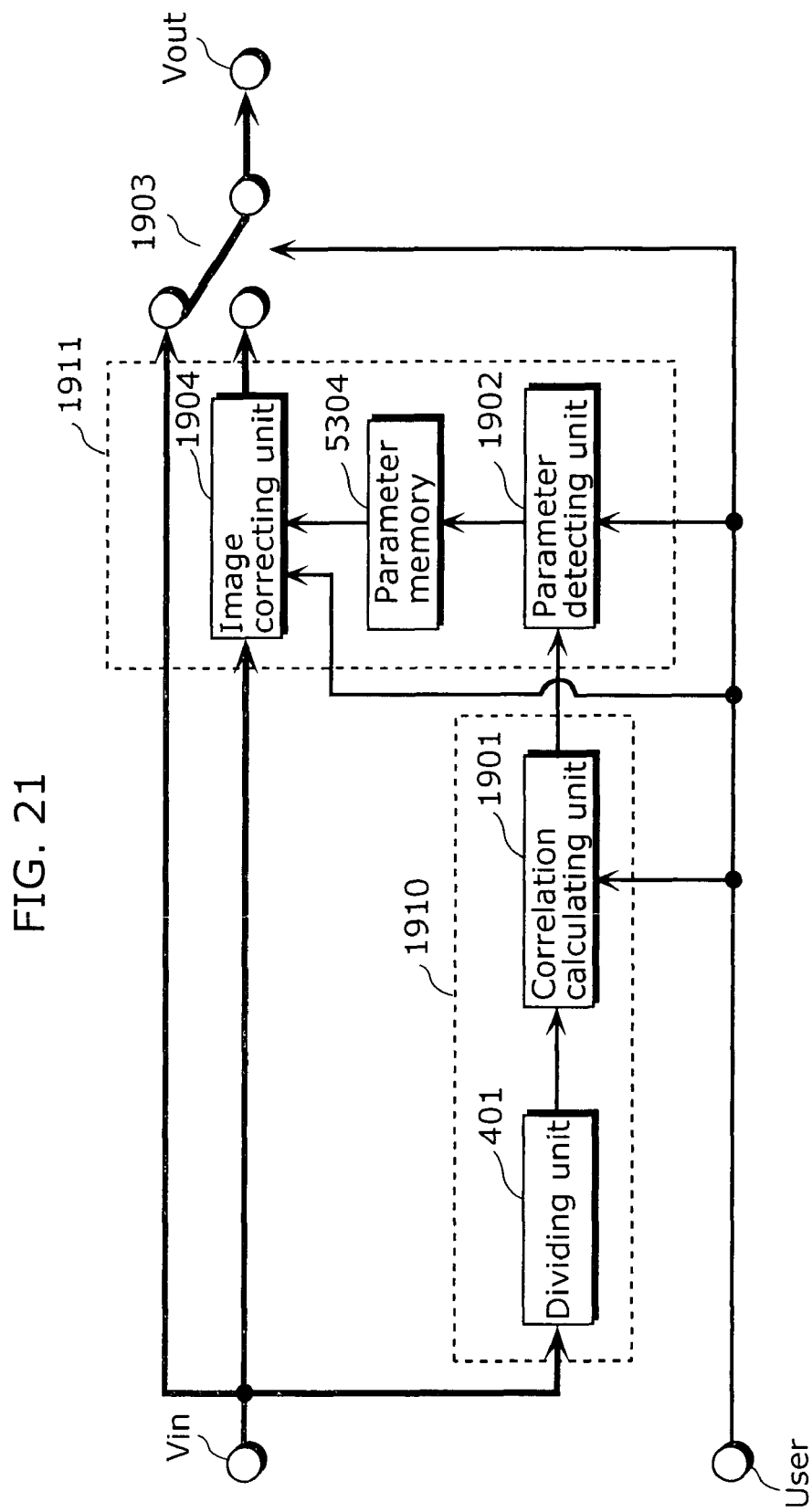
FIG. 21 is a block diagram showing a configuration of an image signal processing apparatus according to a third embodiment.

FIG. 21 is a block diagram showing a configuration of an image signal processing apparatus according to a third embodiment of the present invention. The image signal processing apparatus according to the third embodiment is different from the image signal processing apparatus of the first embodiment in that the image signal processing apparatus according to the third embodiment includes an input unit as an external device which is not shown, and by a user-specified parameter (User) inputted by a user via the external input unit, the following can be changed: a range in which correlation values are calculated; a degree of image modification; and whether or not to perform image modification. The image signal processing apparatus includes a distortion detecting unit 1910, a correction processing unit 1911 and a switch 1903. The distortion detecting unit 1910 includes a dividing unit 401 and a correlation calculating unit 1901. The correction processing unit 1911 includes a parameter memory 5304, a parameter detecting unit 1902 and an image correcting unit 1904.

The dividing unit 401 divides an input picture signal (Vin) into divided units, and the correlation calculating unit 1901 calculates correlation values. In the correlation calculating unit 1901, the user-specified parameter (User) is stored. The user-specified parameter (User) is a set of parameters used for specifying, for the input picture signal (Vin), a range in which correlation values are calculated. With teleconferences, videophones and the like, when there is a vertical pole or the like in the background, for example, the user specifies the part where the pole is using the user-specified parameter (User) so that correlation values are calculated only in a divided unit that includes the part where pole is. As a result, it is possible to significantly reduce calculation processing, and, further, since there is no impact of parts other than the part where the pole is, the vertical correlation of the part where the pole is can be increased, and it is also possible to improve the precision in making the pole vertical. Here, the correlation calculating unit 1901 corresponds to "said distortion detecting unit operable to accept, from a user via a user interface, a specification of an area, and to detect the distortion of the line in the vertical direction in the accepted area, the area being an area within the picture in which the distortion of the line in the vertical direction of the image is to be detected".

Moreover, the parameter detecting unit 1902 detects an image modifying parameter for making an area, where it is considered to have a strong vertical correlation, vertical, and stores the detected image modifying parameter in the parameter memory 5304. In the parameter detecting unit 1902, the user-specified parameter (User) inputted from outside is stored. It is appropriate to correct what is originally vertical to be vertical as it should be, but by performing rather weak modification (that is to bring to a state where it is closer to be vertical) instead of performing modification that makes the area having the strong correlation perfectly vertical, it is possible to keep an adverse effect of image modification under control. The adverse effect caused by image modification is processing of modifying, by mistake, an area which is originally not vertical to be vertical. Thus, using the user-specified parameter (User) inputted from outside, it is instructed to weaken the degree of image modification. Or, it is instructed that image modification is not to be performed on a picture specified in the user-specified parameter (User), or that image modification is not to be performed during a period of time specified in the user-specified parameter (User). Therefore, it is effective to design the parameter detecting unit 1902 to detect an image modifying parameter that matches the instruction specified in the user-specified parameter (User), and to enable the parameter detecting unit 1902 to modify the parameter stored in the parameter memory 5304. Note that this processing is not limited to be performed by the parameter detecting unit 1902, but may be performed by the switch 1903 or the image correcting unit 1904 so that the parameter detecting unit 1902 only stores in the parameter memory a parameter which is the same as the ordinary one.

Based on the image modifying parameter read out from the parameter memory 5304, the image correcting unit 1904 performs image modification on an input picture signal (Vin) and outputs, as an output picture signal (Vout), a signal which is modified to have a stronger vertical correlation. However, in accordance with the degree of image modification specified by the user in the user-specified parameter (User), the image correcting unit 1904 adjusts the degree of modification by multiplying image modifying parameters XR and XL by a predetermined coefficient. Note that in the case where this processing is performed by the parameter detecting unit 1902, the image correcting unit 1904 ignores the user-specified parameter (User). Here, the image correcting unit 1904 corresponds to "said correcting unit operable to accept, from a user via a user interface, a specification of a degree of correction, and to correct the image in the picture to be corrected in accordance with the accepted degree of correction such that an amount of the horizontal shift of the image is adjusted and that a value of a pixel is shifted to an opposite direction by the adjusted amount of the shift, the amount of the horizontal shift being detected by said distortion detecting unit".

In the case where the user-specified parameter (User) inputted from outside instructs that image modification is not desired, the switch 1903 outputs the image as it is, that is, the image before modification is performed (that is, the input picture signal (Vin)). Here, the switch 1903 corresponds to "said correcting unit operable to accept, from a user via an interface, a specification of a period of time during which correction is not performed, and to output an input picture as-is during the accepted period of time, the input picture corresponding to the picture which is to be corrected". The case where modification is not desired refers to a case where the user wishes to check the effect of performing and not performing modification and a case where a line which is not originally vertical is corrected to be vertical.

The above described example is a case where the following is changed according to a user-specified parameter (User): the range in which correlation values are calculated; the degree of image modification; and whether or not to perform image modification. However, it is not necessary to change all of the mentioned conditions, and the user may change a part of them.

Moreover, in order to further reduce the amount of calculation necessary for calculating correlation values and detecting an image modifying parameter, calculation of correlation values and detection of an image modifying parameter need not be performed for every image of a moving picture signal. For example, the processing may be performed for every k th image where k is an arbitrary natural number, or calculation of correlation values and detection of an image modifying parameter may be performed at a timing specified by the user's instruction inputted from outside.

Fourth Embodiment

Figure 22:
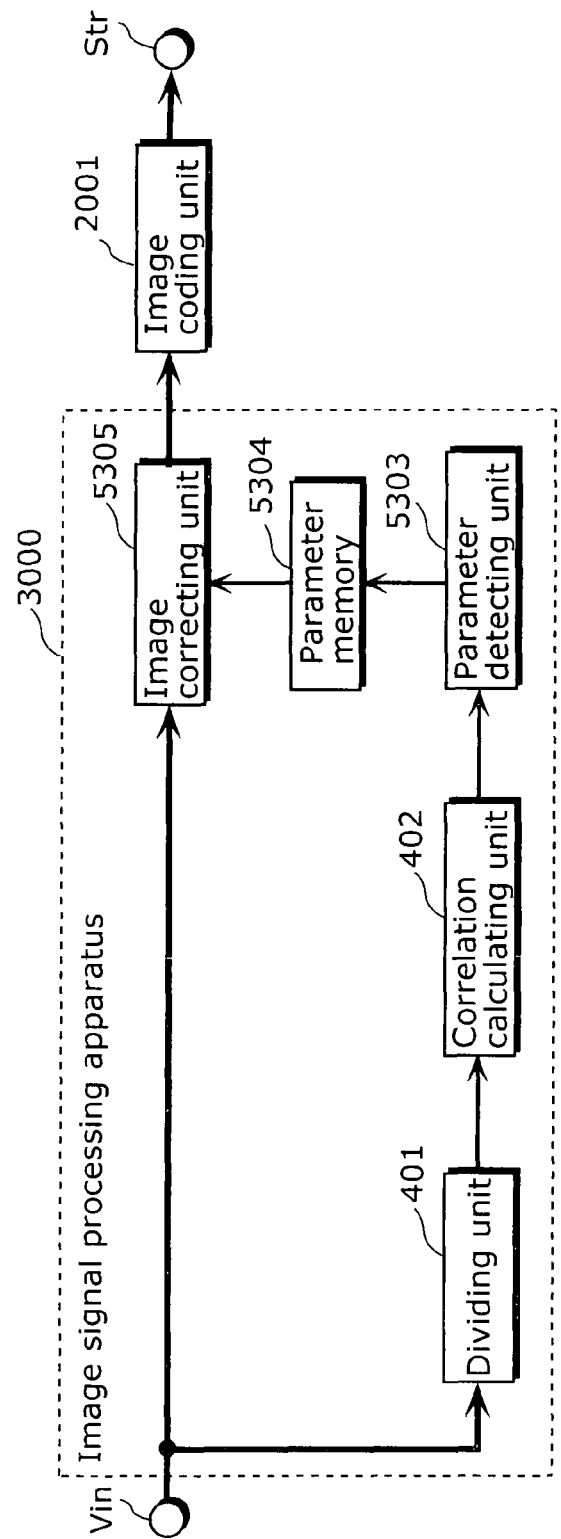
FIG. 22 is a block diagram showing a configuration of an image coding apparatus according to a fourth embodiment.

FIG. 22 is a block diagram showing a configuration of an image coding apparatus according to a fourth embodiment. The part surrounded by a dotted line in the figure is a configuration which is the same as that of the image signal processing apparatus 3000 according to the present invention shown in FIG. 3. An image coding unit 2001 codes an image modified by the image correcting unit 5305, and output the coded image as an image coded stream (Str).

In a teleconference and videophone system according to the fourth embodiment, an image shot by the camera 101 is coded and then transmitted to the party at the other end. The image signal processing apparatus, the configuration of which is shown in FIG. 3, performs image modification on the image shot by the camera 101 to have a stronger vertical correlation value, and then the image coding unit 2001 codes the modified image. Thus, on the other party side (the receiver side), by simply receiving and decoding the image coded stream (Str), it is possible to display the appropriately corrected image in which the subject that should originally be vertical is not tilted. Here, the image coding unit 2001 corresponds to "a coding unit operable to code a picture corrected by said correcting unit and output a coded sequence".

Fifth Embodiment

Figure 23:
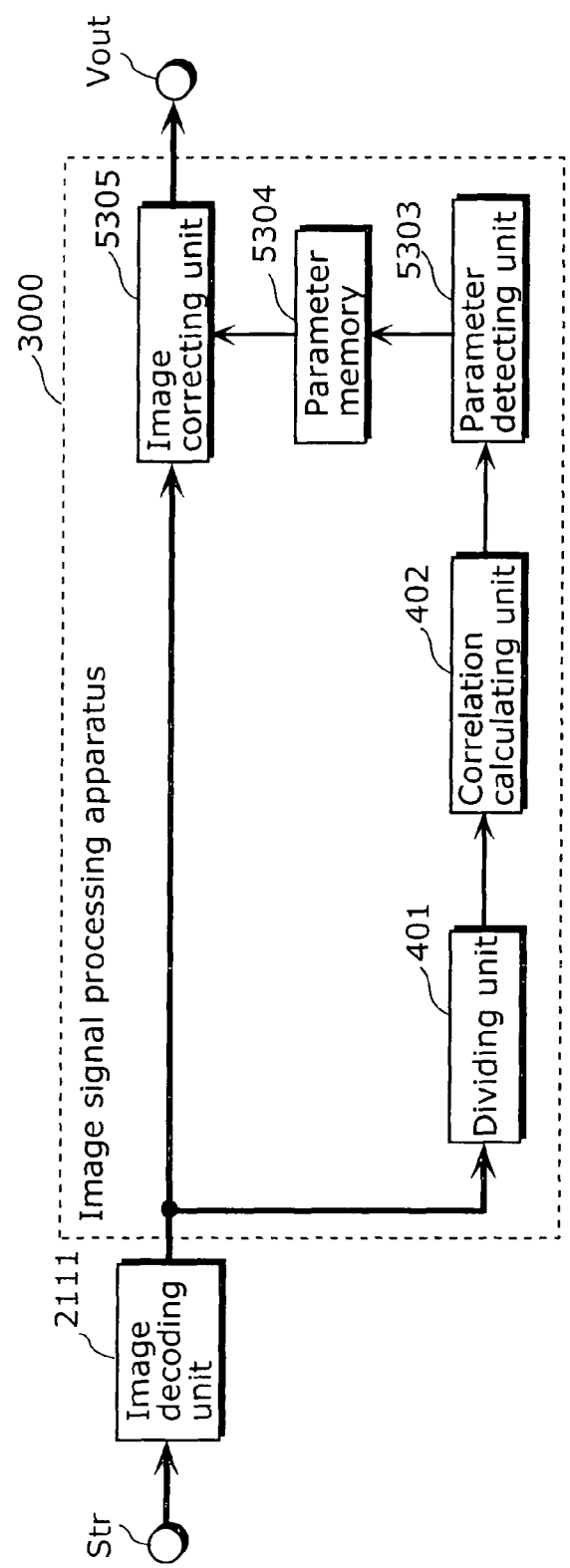
FIG. 23 is a block diagram showing a configuration of an image decoding apparatus according to a fifth embodiment.

FIG. 23 is a block diagram showing a configuration of an image decoding apparatus according to a fifth embodiment. The part surrounded by a dotted line in the FIG. is a configuration which is the same as the configuration shown in FIG. 3. An image decoding unit 2111 decodes an image coded stream (Str), and after the image signal processing apparatus shown in FIG. 3 performs image modification so as to have a stronger vertical correlation value between the values of pixels in rows, an output picture signal (Vout) is outputted to be displayed by a display apparatus 102.

In the case where the party on the transmitting end transmits an image coded stream (Str) which is an image shot by the camera 101 and coded as it is, a subject which should originally be vertical cannot be displayed as vertical if the party on the receiving side merely receives and decodes the image coded stream (Str). Thus, the image decoded by the image decoding unit 2111 is modified using an image modifying parameter detected through a process performed by the image signal processing apparatus shown in FIG. 3. As a result, the image is modified so that the subject which should originally be vertical becomes appropriately vertical, and thus even the image coded stream (Str) which is an image shot by the camera 101 and coded without being modified can be appropriately modified to be displayed as vertical. Here, the image decoding unit 2111 corresponds to "a decoding unit operable to decode an inputted coded sequence", the correlation calculating unit 402 and the parameter detecting unit 5303 correspond to "said distortion detecting unit operable to detect, in a video obtained through decoding performed by said decoding unit, the distortion of the line in the vertical direction of the image within the distortion detecting picture in which the distortion is detected", and the image correcting unit 5305 corresponds to "said correcting unit operable to correct the distortion of the line in the vertical direction in the picture to be corrected, the distortion being detected by said distortion detecting unit".

Note that in the above described embodiments, it has been described that the image modification applies to cameras used in teleconferences and videophones, and that correction is performed in order to correct a tilt of a line in the vertical direction included in a picture of a moving picture, however, the present invention is not limited to this. For example, by switching between the process for rows and the process for columns, it is also possible to correct a tilt of a line in the horizontal direction by the same method as the one described in the above embodiments.

Moreover, according to the present invention described in the second embodiment, correction can be performed even in the case where a picture from which a distortion is detected and a picture which is to be corrected are the same pictures. Therefore, correction of a distortion in the vertical direction in an image can be applied not only to a picture in a moving image but also to a still picture in a similar manner.

Sixth Embodiment

Further, by storing a program for implementing the image signal processing method described in each of the above described embodiments in a recording medium such as a flexible disc, it is possible to easily perform, in an independent computer system, the processing described in each of the above described embodiments.

Figure 24A:
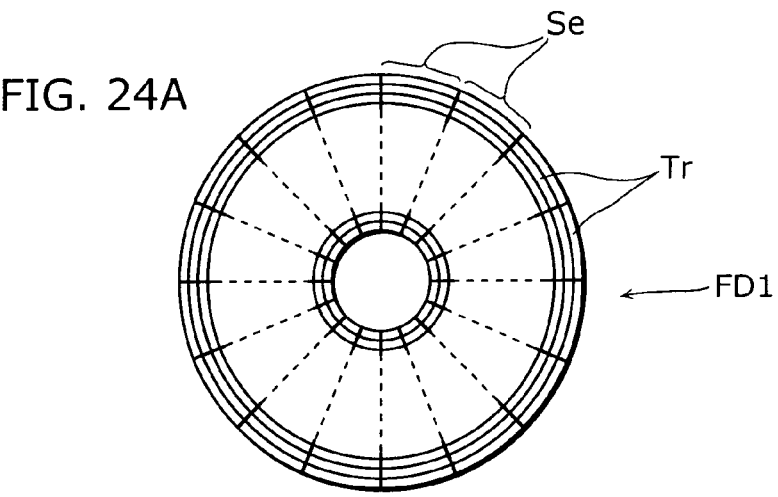
FIGS. 24A, 24B and 24C are illustrative diagrams of an image signal processing method of the above mentioned embodiments implemented by a computer system using a program recorded on such a recording medium as a flexible disc.
Figure 24B:
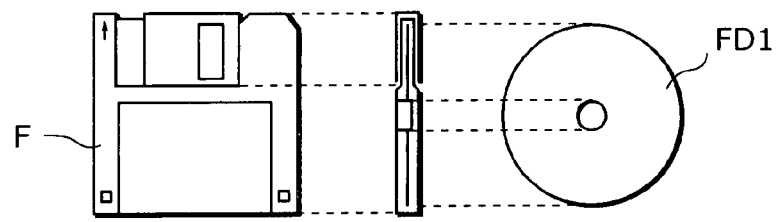
Figure 24C:
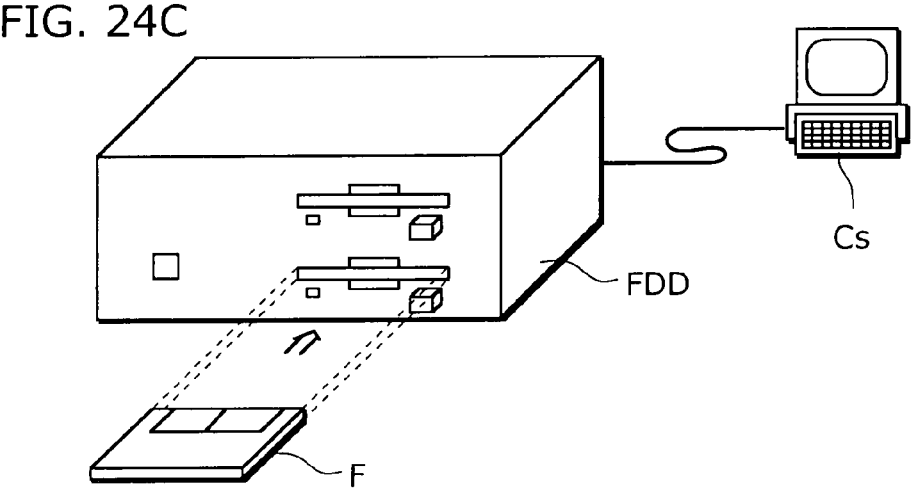

FIGS. 24A, 24B and 24C are illustrative diagrams of the image signal processing method according to each of the above described embodiments implemented by a computer system using a program recorded on such a recording medium as a flexible disc.

FIG. 24B shows a flexible disc and the front view and the cross-sectional view of the appearance of the flexible disc, and FIG. 24A shows an exemplary physical format of a flexible disc as a recording medium body. A flexible disc (FD) is contained in a case (F), a plurality of tracks (Tr) are formed concentrically on the surface of the disc from the periphery into the inner radius of the disc, and each track is divided into 16 sectors (Se) in the angular direction. Therefore, with the flexible disc storing the above mentioned program, the above mentioned program is recorded in an area allocated for it on the flexible disc (FD).

Also, FIG. 24C shows the structure for recording and reading out the program on the flexible disc (FD). In the case where the program for implementing the image signal processing method is recorded on the flexible disc (FD), the computer system (Cs) writes the program via a flexible disc drive (FDD). Also, in the case where the above mentioned image signal processing method for embodying an image signal processing apparatus is constructed in the computer system by the program on the flexible disc, the program is read out from the flexible disc via a flexible disc drive (FDD) and transferred to the computer system.

Note that the recording medium is described using the example of a flexible disc in the above description, however, optical discs can also be used for the same processing. Also, the recording medium is not limited this, and IC cards, ROM cassettes and the like which can record a program can also be used.

Note that each of functional blocks shown in the block diagrams (FIGS. 3, 20, 21, 22 and 23) is typically embodied as an LSI which is an integrated circuit. These functional blocks may be individually incorporated into a chip or may be incorporated into a chip to include a part or all of them. For example, the functional blocks except for a memory may be incorporated into a chip. Here, the integrated circuit is referred to as an LSI, however, there are cases where the integrated circuit is called an IC, a system LSI, a super LSI and an ultra LSI, depending on the degree of integration.

Further, the integrated circuit is not limited to such LSI, and may be embodied as a private circuit or a general-purpose processor. A Field Programmable Gate Array (FPGA) which can store programs after the manufacturing of an LSI, or a reconfigurable processor which can reconfigure, after the manufacturing of an LSI, connection and setting of a circuit cell included in the LSI may be used instead.

Furthermore, when a progress in semiconductor technology or an other technology deriving from the semiconductor technology leads to an introduction of a new technology for the incorporation of components into an integrated circuit which replaces the LSI, the above mentioned functional blocks may surely be integrated using such new technology. There is a possibility of adaptation and the like of biotechnology.

In addition, among the functional blocks, the means for storing data to be coded or decoded may be a separate configuration instead of incorporating the means into a chip.

As describe above, in the present invention, since a picture signal is modified using only information on a shot image, there is no need to measure or obtain by a sensor in advance the distance between the camera and the subject and the orientation of the camera, and thus, image modification can be inexpensively and easily accomplished in order to correct the part which should originally be a vertical line or a horizontal line to be vertical or horizontal.

Therefore, it is possible to significantly reduce distortions in shot images even when the subject cannot be shot from its front and reduce the unnatural impression that the images give during teleconferences and videophone calls. Accordingly, the industrial utility value of the present invention is high.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An image signal processing apparatus which corrects a distortion of an image in a picture in a moving picture including plural pictures that are sequentially inputted, said image signal processing apparatus comprising:
   a distortion detecting unit operable to detect the distortion of a line in a vertical direction in a distortion detecting picture in which the distortion is detected; and
   a correcting unit operable to correct an image in a picture to be corrected which is inputted subsequent to the distortion detecting picture, so as to eliminate a horizontal shift of the image corresponding to the distortion of the line in the vertical direction detected by said distortion detecting unit,
   wherein said distortion detecting unit includes a vertical correlation calculating unit operable to calculate, for plural amounts of shifts, correlations between values of pixels that are arranged on at least two horizontal rows of the distortion detecting picture, the pixels having an amount of the horizontal shift equal to each other and being in a relative positional relationship with each other, and
   wherein said correcting unit is operable to correct the image in the picture to be corrected so as to shift to an opposite direction by the amount of the horizontal shift at which a degree of correlation is at its peak, the degree of correlation being represented by the correlation calculated from said distortion detecting picture.

2. The image signal processing apparatus according to claim 1,
   wherein said vertical correlation calculating unit is operable to calculate, for each of the amounts of the shifts, a product sum of the values of the pixels that are arranged on the horizontal rows, and
   said correcting unit is operable to judge that the degree of correlation is great when the product sum is great, the product sum being calculated by said vertical correlation calculating unit.

3. The image signal processing apparatus according to claim 1,
   wherein said vertical correlation calculating unit is operable to calculate, for each of the amounts of the shifts, a sum of absolute differences between the values of the pixels that are arranged on the horizontal rows, and
   said correcting unit is operable to judge that the degree of correlation is great when the sum of the absolute differences is small, the sum of the absolute differences being calculated by said vertical correlation calculating unit.

4. The image signal processing apparatus according to claim 1,
   wherein said distortion detecting unit is further operable to accept, from a user via a user interface, a specification of an area, and to detect the distortion of the line in the vertical direction in the accepted area, the area being an area within the picture in which the distortion of the line in the vertical direction of the image is to be detected.

5. The image signal processing apparatus according to claim 1,
   wherein said correcting unit is further operable to accept, from a user via a user interface, a specification of a degree of correction, and to correct the image in the picture to be corrected in accordance with the accepted degree of correction so as to adjust an amount of the horizontal shift of the image and to shift to an opposite direction by the adjusted amount of the shift, the amount of the horizontal shift being detected by said distortion detecting unit.

6. The image signal processing apparatus according to claim 1,
   wherein said correcting unit is further operable to accept, from a user via an interface, a specification of a period of time during which correction is not performed, and to output an input picture as-is during the accepted period of time, the input picture corresponding to the picture which is to be corrected.

7. The image signal processing apparatus according to claim 1,
   wherein said distortion detecting unit is operable to detect the distortion in a specific picture, and
   said correcting unit is operable to correct the image in the picture to be corrected based on the distortion detected in the specific picture prior to the picture to be corrected, the distortion being of the line in the vertical direction, and the picture to be corrected being a picture other than the specific picture in which said distortion detecting unit detects the distortion.

8. The image signal processing apparatus according to claim 1,
   wherein said distortion detecting unit is operable to detect the distortion in plural specific pictures, and
   said correcting unit is operable to temporally smooth amounts of correction by averaging amounts of shifts, and correct the image in the picture to be corrected with the temporally smoothed amounts of correction, the picture to be corrected being a picture other than the specific pictures in which said distortion detecting unit detects the distortion, and the amounts of the shifts being detected in the plural specific pictures inputted before the picture to be corrected.

9. The image signal processing apparatus according to claim 1, further comprising
   a coding unit operable to code a picture corrected by said correcting unit and output a coded sequence.

10. The image signal processing apparatus according to claim 1, further comprising
    a decoding unit operable to decode an inputted coded sequence, wherein said distortion detecting unit is operable to detect, in a video obtained through decoding performed by said decoding unit, the distortion of the line in the vertical direction of the image within the distortion detecting picture in which the distortion is detected, and said correcting unit is operable to correct the distortion of the line in the vertical direction in the picture to be corrected, the distortion being detected by said distortion detecting unit.

11. An image signal processing method for correcting a distortion of an image in a picture in a moving picture including plural pictures that are sequentially inputted, said method comprising:

detecting the distortion of a line in a vertical direction in a distortion detecting picture in which the distortion is detected; and correcting an image in a picture to be corrected which is inputted subsequent to the distortion detecting picture, so as to eliminate a horizontal shift of the image corresponding to the distortion of the line in the vertical direction detected in said detecting, wherein said detecting comprises calculating, for plural amounts of shifts, correlations between values of pixels that are arranged on at least two horizontal rows of the distortion detecting picture, the pixels having an amount of the horizontal shift equal to each other and being in a relative positional relationship with each other, and wherein said correcting comprises correcting the image in the picture to be corrected so as to shift to an opposite direction by the amount of the horizontal shift at which a degree of correlation is at its peak, the degree of correlation being represented by the correlation calculated from said distortion detecting picture.

12. A non-transitory computer-readable medium having a program stored thereon, the program being for an image signal processing apparatus which corrects a distortion of an image in a picture in a moving picture including plural pictures that are sequentially inputted, said program causing a computer to execute a method comprising:

detecting the distortion of a line in a vertical direction in a distortion detecting picture in which the distortion is detected; and correcting an image in a picture to be corrected which is inputted subsequent to the distortion detecting picture, so as to eliminate a horizontal shift of the image corresponding to the distortion of the line in the vertical direction detected in the detecting, wherein said detecting comprises calculating, for plural amounts of shifts, correlations between values of pixels that are arranged on at least two horizontal rows of the distortion detecting picture, the pixels having an amount of the horizontal shift equal to each other and being in a relative positional relationship with each other, and wherein said correcting comprises correcting the image in the picture to be corrected so as to shift to an opposite direction by the amount of the horizontal shift at which a degree of correlation is at its peak, the degree of correlation being represented by the correlation calculated from said distortion detecting picture.

13. An integrated circuit for correcting, a distortion of an image in a picture in a moving picture including plural pictures that are sequentially inputted, said integrated circuit comprising:

a distortion detecting unit operable to detect the distortion of a line in a vertical direction in a distortion detecting picture in which the distortion is detected; and a correcting unit operable to correct an image in a picture to be corrected which is inputted subsequent to the distortion detecting picture, so as to eliminate a horizontal shift of the image corresponding to the distortion of the line in the vertical direction detected by the distortion detecting unit, wherein said distortion detecting unit includes a vertical correlation calculating unit operable to calculate, for plural amounts of shifts, correlations between values of pixels that are arranged on at least two horizontal rows of the distortion detecting picture, the pixels having an amount of the horizontal shift equal to each other and being in a relative positional relationship with each other, and wherein said correcting unit is operable to correct the image in the picture to be corrected so as to shift to an opposite direction by the amount of the horizontal shift at which a degree of correlation is at its peak, the degree of correlation being represented by the correlation calculated from said distortion detecting picture.

* * * * *